United States Patent
Masias et al.

(10) Patent No.: US 12,529,428 B2
(45) Date of Patent: Jan. 20, 2026

(54) ADJUSTABLE CAGE ASSEMBLY FOR FLOW CONTROL DEVICES

(71) Applicant: Emerson Process Management Regulator Technologies, Inc., McKinney, TX (US)

(72) Inventors: Justin Masias, Tom Bean, TX (US); David Scheffert, Marshalltown, IA (US)

(73) Assignee: Emerson Process Management Regulator Technologies, Inc., McKinney, TX (US)

(*) Notice: Subject to any disclaimer, the term of this patent is extended or adjusted under 35 U.S.C. 154(b) by 11 days.

(21) Appl. No.: 18/686,725

(22) PCT Filed: Aug. 24, 2022

(86) PCT No.: PCT/US2022/041384
§ 371 (c)(1),
(2) Date: Feb. 26, 2024

(87) PCT Pub. No.: WO2023/028150
PCT Pub. Date: Mar. 2, 2023

(65) Prior Publication Data
US 2024/0376987 A1    Nov. 14, 2024

Related U.S. Application Data

(63) Continuation-in-part of application No. 17/410,805, filed on Aug. 24, 2021, now Pat. No. 11,629,788.
(Continued)

(51) Int. Cl.
*F16K 1/52* (2006.01)
*F16K 1/54* (2006.01)
(Continued)

(52) U.S. Cl.
CPC ............ *F16K 1/52* (2013.01); *F16K 1/54* (2013.01); *F16K 3/32* (2013.01); *F16K 47/08* (2013.01)

(58) Field of Classification Search
CPC ... F16K 1/526; F16K 3/26; F16K 3/32; F16K 1/54; F16K 2200/502; F16K 1/52; F16K 47/08
See application file for complete search history.

(56) References Cited

U.S. PATENT DOCUMENTS 8,950,431 B2 * 2/2015 Kim .................. F16K 47/08
137/625.33
10,830,358 B2    11/2020 Hoistetter et al.
(Continued)

FOREIGN PATENT DOCUMENTS

JP    5-322054 A    12/1993

OTHER PUBLICATIONS

Brochure for Noise-Attenuation Technologies for Control Valves, Emerson Automation Solutions Flow Controls, May 2018, 16 pages.
(Continued)

*Primary Examiner* — Marina A Tietjen
(74) *Attorney, Agent, or Firm* — Quarles & Brady LLP

(57) ABSTRACT

An adjustable cage assembly for a flow control device can include a first cage body and a second cage body or a plurality of inserts. The second cage body can be rotated relative to the first cage body, or one or more of the inserts can be selectively secured to the first cage body, to provide different radial flow patterns through the assembly.

19 Claims, 14 Drawing Sheets

Related U.S. Application Data

(60) Provisional application No. 63/352,307, filed on Jun. 15, 2022.

(51) Int. Cl.
*F16K 3/32* (2006.01)
*F16K 47/08* (2006.01)

(56) References Cited

U.S. PATENT DOCUMENTS

| | | |
|---|---|---|
| 11,035,479 B2 | 6/2021 | Masias et al. |
| 2007/0272316 A1 | 11/2007 | Zecchi et al. |
| 2008/0258097 A1 | 10/2008 | Griffin et al. |
| 2013/0126770 A1* | 5/2013 | O'Brien ............... F16K 5/04 251/318 |
| 2017/0184219 A1 | 6/2017 | Braeuer |
| 2019/0120388 A1 | 4/2019 | Kloss |
| 2020/0325996 A1 | 10/2020 | Hostetter et al. |
| 2021/0260705 A1* | 8/2021 | Spinella ............... F16K 47/08 |

OTHER PUBLICATIONS

Product brochure for High Pressure Transmission and Distribution Pressure Control, EZH and EZHSO Series Pressure Reducing Regulators, Emerson Automation Solutions, Oct. 2017, 2 pages.
Instruction Manual for Types EZH and EZHSO Pressure Reducing Regulators, Emerson Automation Solutions, May 2019, 40 pages.

* cited by examiner

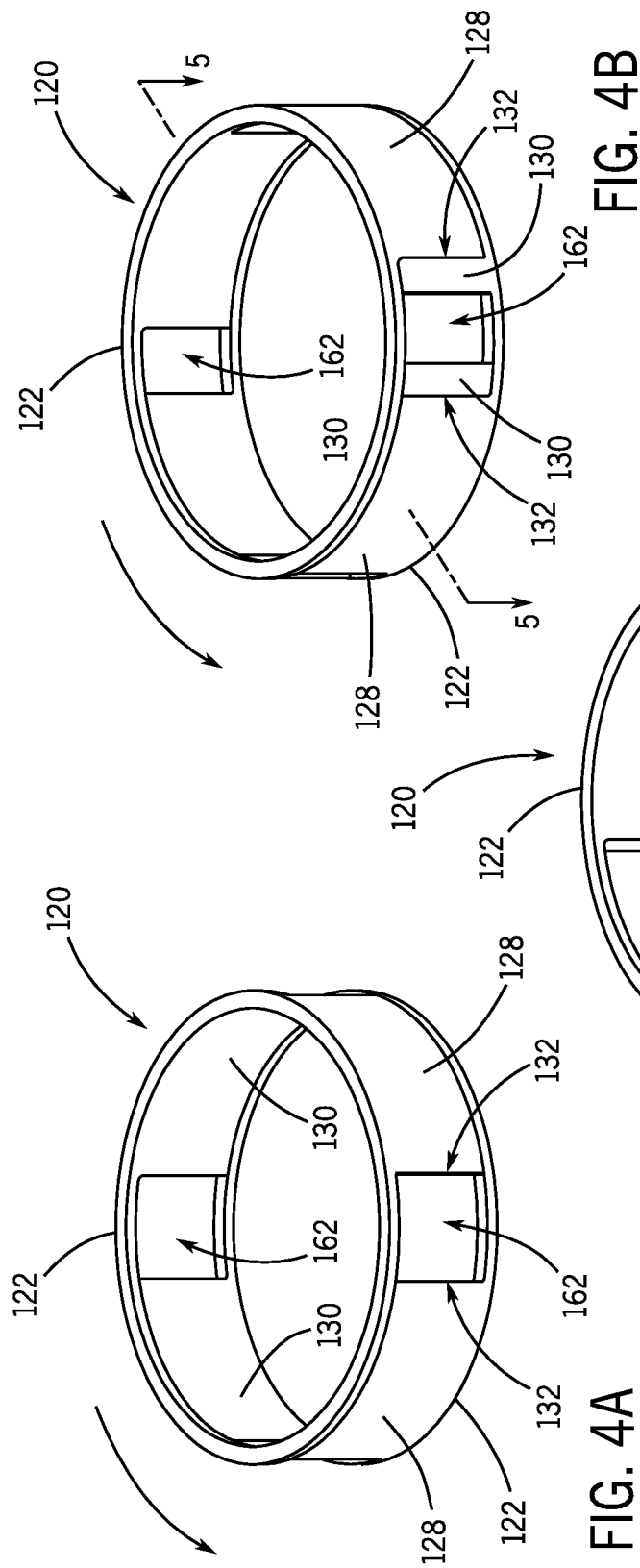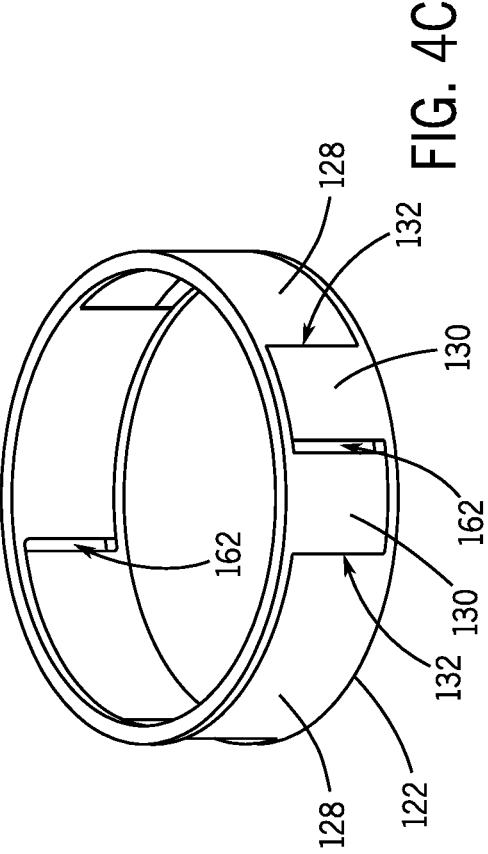

ADJUSTABLE CAGE ASSEMBLY FOR FLOW CONTROL DEVICES

CROSS-REFERENCE TO RELATED APPLICATIONS

This application represents the national phase entry of PCT/US2022/041384, filed Aug. 24, 2022, which claims priority to U.S. patent application Ser. No. 17/410,805, filed Aug. 24, 2021 and now granted as U.S. Pat. No. 11,629,788, and U.S. provisional patent application No. 63/352,307, filed Jun. 15, 2022, the entireties of all of which are incorporated herein by reference.

BACKGROUND

Flow control devices can be used in a variety of industrial, commercial, and other settings including to regulate flowrate or pressure of a fluid flowing from a fluid source. In some applications, it may be useful to manage the flowrate or pressure or other characteristics of a fluid flowing from the pressure source toward a downstream application or device.

SUMMARY

Some examples of the disclosed technology provide a restriction cage configured to adjust flow through a flow control device. Some examples of the disclosed technology provide a noise attenuating cage configured to adjust a sonic response of flow through a flow control device.

Some examples of the disclosed technology provide an adjustable cage assembly for a flow control device. The adjustable cage can include a first cage body and a second cage body. Each of the first and second cage bodies include a first wall segment having an interior surface and an exterior surface, a first locking feature formed on the interior surface of the first wall segment, a second wall segment having an interior surface and an exterior surface, and a second locking feature formed on the exterior surface of the second wall segment. The first wall segment and the second wall segment can be spaced in a circumferential direction to form a first opening therebetween. The first locking feature of the first cage body can be configured to engage the second locking feature of the second cage body to rotationally secure the first cage body relative to the second cage body at one of a plurality of alignments, to at least partially align the first opening of the first cage body at one of a plurality alignments to at least partially align the first opening of the first cage body with the first opening of the second cage body to form a corresponding plurality of opening profiles for flow across the first and second cage bodies.

In some examples, an adjustable cage assembly can include first and second locking features. The first or second locking features can include an array of locking members.

In some examples, an adjustable cage assembly can include a locking member of an array of locking members configured as a rib that extends axially relative to a corresponding first or second cage body.

In some examples, an adjustable cage assembly can include an array of locking members. The array of locking members can include a plurality of ribs and a plurality of grooves between the plurality of ribs. One of the plurality of grooves or the plurality of ribs can correspond to a plurality of alignments.

In some examples, an adjustable cage assembly can include first and second cage bodies. The cage bodies can each include a continuous annular base. First and second wall segments can extend axially from the annular base.

In some examples, an adjustable cage assembly can include first and second cage bodies. The first and second cage bodies can include third and fourth wall segments extending axially from an annular base and opposite first and second wall segments, respectively.

In some examples, an adjustable cage assembly can include an interior surface of a first wall segment of a first cage body that faces an exterior surface of a second wall segment of a second cage body at each of a plurality of alignments.

In some examples, an adjustable cage assembly can include a first opening symmetric about an axis and configured to form a linearly variable flow opening.

In some examples, an adjustable cage assembly can include a cage body that defines a central axis. The cage body can also include a first wall segment that is radially farther from the central axis than a second wall segment.

In some examples, an adjustable cage assembly can include an opening profile. The opening profile corresponding to a first opening of a first cage body being fully radially aligned with a first opening of a second cage body provides a least-restrictive position for the adjustable cage assembly. The opening profile corresponding to the first wall segment of the first cage body extending circumferentially to the greatest extend across the first opening of the second cage body provides a most-restrictive position for the adjustable cage assembly. Additional opening profiles provide additional positions between the least-restrictive and most-restrictive positions.

In some examples, an adjustable cage assembly can include first and second cage bodies that are substantially identical to each other.

Some examples of the disclosed technology provide a restriction cage for a flow control device. The restriction cage can include a first annular member and a second annular member. The second annular member can be configured to be rotationally fixed relative to the first annular member at a plurality of alignments to provide a flow opening of a corresponding plurality of sizes, to provide adjustable control of fluid flowrates through the restriction cage.

In some examples, a restriction cage can include a first annular member having a first circumferential wall and a first cutout formed in the first circumferential wall.

In some examples, a restriction cage can include a second annular member having a second circumferential wall configured to axially overlap a first circumferential wall. Rotating the second annular member relative to a first annular member can adjust an amount of overlap between the first circumferential wall and the second circumferential wall.

In some examples, a restriction cage can include a second annular member having a second circumferential wall and a second cutout formed in the second circumferential wall. An alignment of a first cutout with the second cutout can define a current size of a flow opening.

In some examples, a restriction cage can include a first annular member. The first annular member can include an array of first locking members and a second annular member can include a second locking member. The second locking member can be configured to engage the array of first locking members to secure the first and second annular members at a plurality of alignments.

In some examples, a restriction cage can include a plurality of first locking members that are configured as one of a recess or a protrusion. Second locking members can be configured as the other of the recess or the protrusion.

In some examples, a restriction cage can include a first annular member that is substantially identical to a second annular member.

Some examples of the disclosed technology provide a method of adjusting an effective flow area in a flow control device. The method can include rotating a first cage body having a first opening relative to a second cage body having a second opening to align the first opening with the second opening at any selected one of a plurality of alignments to define an effective flow area, rotationally securing the first cage body relative to the second cage body in the selected one of the plurality of alignments, and installing the first cage body and the second cage body in the flow control device at a flow control opening.

In some examples, a method of adjusting an effective flow area in a flow control device can include, from a reference orientation, rotating a first cage body relative to a second cage body in a first direction to increase the effective flow area and rotating the first cage body relative to the second cage body in a direction opposite the first direction to decrease the effective flow area.

In some examples, a method of adjusting an effective flow area in a flow control device can include, for a degree of rotation within a first rotational range, rotating a first cage body relative to a second cage body to linearly increase or decrease the effective flow area relative to the degree of rotation.

Some examples of the disclosed technology provide an adjustable cage assembly for a flow control device. A first cage body can have an interior surface and an exterior surface and first openings extending from the interior surface to the exterior surface to provide a first-body radial flow area through the first cage body. A second cage body can have an interior surface and an exterior surface and second openings extending from the interior surface to the exterior surface to provide a second-body radial flow area through the second cage body. The adjustable cage assembly can have a first configuration and a second configuration. In the first configuration, one or more of the first or second cage bodies defines an annular assembly with the one or more of the first openings or the second openings, respectively, of the one or more of the first or second cage bodies providing a first cage-assembly radial flow area through the one or more of the first or second cage bodies. In the second configuration, the first and second cage bodies collectively define an annular assembly with an alignment of the first openings relative to the second openings that provides a second cage-assembly radial flow area through the first and second cage bodies that is smaller than the first cage-assembly radial flow area.

In some examples a first cage body can be a first annular cage body and a second cage body can be a second annular cage body sized to nest concentrically with the first annular cage body. The first and second annular cage bodies can collectively define an annular assembly of a first configuration, and can be differently rotationally aligned relative to each other in the first configuration as compared to a second configuration.

In some examples, first and second annular cage bodies can be selectively lockable in one or more (e.g., a plurality of) configurations. In some examples, first and second annular cage bodies collectively include a detent arrangement to selectively lock the first and second annular cage bodies in first and second configurations. In some examples, first openings can be arranged with a circumferential spacing between an adjacent set of the first openings along a first circumference of a first annular cage body, second openings can be arranged with a circumferential spacing between an adjacent set of the second openings along a second circumference of the second annular cage body that is the same as the circumferential spacing of the first openings, and a detent arrangement can include a first stop and a second stop spaced apart by a circumferential spacing that is greater than the circumferential spacing of the first and second openings.

In some examples, first and second annular cage bodies are selectively lockable in multiple configurations, including a first configuration, a second configuration, and a third configuration in which the first and second annular cage bodies collectively define an annular assembly with an alignment of the first openings relative to the second openings that provides a third cage-assembly radial flow area through the first and second annular cage bodies that is smaller than each of a first cage-assembly radial flow area for the first configuration and a second cage-assembly radial flow area for the second configuration.

In some examples, a first cage body can be a first annular cage body that includes a first insert recess. A second cage body can be a removable insert that is received in the first insert recess with the adjustable cage assembly in one operational configuration and not received in the first insert recess with the adjustable cage assembly in another operational configuration.

In some examples, an adjustable cage assembly can include a plurality of removable inserts. Each of the plurality of the removable inserts can be sized to be selectively (e.g., and separately) received in an insert recess of an annular cage body and can provide a respective one of a plurality of different cage-assembly radial flow areas through, collectively, the first openings of the first annular cage body and openings of the removable insert, when received in the insert recess (e.g., the inserts can collectively provide different cage-assembly radial flow areas through, collectively, the first openings of the first annular cage body and openings of the removable insert, depending on which of the removable inserts is received in which insert recess). In some examples, a first removable insert can include a first pattern of flow openings and a second removable insert can include a second pattern of flow openings different from the first pattern. In some examples, a first annular cage body can include a plurality of insert recesses configured to selectively receive different arrangements of multiple inserts to define a corresponding plurality of cage-assembly radial flow areas through the adjustable cage assembly.

In some examples, a first insert recess can include a dovetail profile sized to receive a complementary dovetail profile of a first insert recess.

In some examples, an adjustable cage assembly can be configured for flow through a flow control device in a radial flow direction relative to the adjustable cage assembly. In some examples, a first insert recess can be arranged on an upstream one of the interior surface and the exterior surface of a first annular cage body, relative to the radial flow direction.

Some examples provide a flow control device with an annular cage body and a plurality of removable inserts. The annular cage body can have an interior surface and an exterior surface, first openings extending from the interior surface to the exterior surface to provide a first-body radial flow area through the first cage body, and first insert recesses arranged circumferentially around the annular cage body. Each of the plurality of removable inserts can have an interior surface and an exterior surface and insert openings extending from the interior surface to the exterior surface. Each of the plurality of removable inserts can be sized to be selectively received in the first insert recess to provide a corresponding radial flow area defined by an overlap pattern between the first openings and the insert openings. The adjustable cage assembly can have a first radial flow area corresponding to the overlap pattern provided by a first insert of the removable inserts and a second, different radial flow area corresponding to the overlap pattern provided by a second insert of the removable inserts.

In some examples, insert openings of a first removable insert can include openings with a larger diameter than first openings through an annular cage body. In some examples, a removable insert can include no insert openings that extend from an interior surface to an exterior surface of the removable insert.

In some examples, an annular cage body can include a seat end and a flow end, the seat end being configured to be oriented closer to a seat of the flow control device. A first insert recess can include a shelf at the seat end of the annular cage body to secure removable inserts within the first insert recess.

In some examples, a first insert recess can include dovetail edges sized to engage corresponding dovetail edges of one or more removable inserts.

In some examples, an annular cage body can include a plurality of insert recesses arranged circumferentially around the annular cage body (including, e.g., a first insert recess), the insert recesses being sized to selectively receive different arrangements of the plurality of removable insets to define a plurality of different total radial flow areas for the adjustable cage assembly.

Some examples can provide a method of adjusting an effective flow area in a flow control device. A first insert can be selected from a plurality of removable inserts, each of the plurality of removable inserts having insert flow openings arranged to provide a respective flow area for flow through the removable insert (e.g., each insert of the plurality having a different pattern of radial flow openings). The first insert (e.g., a dovetail insert) can be inserted (e.g., axially inserted) into a first insert recess of an annular cage body (e.g., one of a plurality of dovetail or other recesses on an upstream cage body surface) to form a first configuration of an adjustable cage assembly with a first overlap pattern between the insert flow openings of the first insert and flow openings of the annular cage body at the first insert recess, the first overlap pattern defining a first radial flow area for flow through the first configuration of the adjustable cage assembly. The first insert can be removed from the first insert recess. A second removable insert can be selected from the plurality of removable inserts, the second removable insert having a different arrangement of insert flow openings than the first removable insert. The second insert can be inserted into the first insert recess to form a second configuration of the adjustable cage assembly, with a second overlap pattern between the insert openings of the second insert and the flow openings of the annular cage body at the first insert recess, the second overlap pattern defining a second radial flow area for flow through the second configuration of the adjustable cage assembly that is different from the first radial flow area.

BRIEF DESCRIPTION OF THE DRAWINGS

The accompanying drawings, which are incorporated in and form a part of this specification, illustrate examples of the disclosed technology and, together with the description, serve to explain the principles of examples of the disclosed technology:

FIG. 4A is an isometric view of the adjustable cage assembly of FIG. 2 in a fully-open position.

FIG. 4B is an isometric view of the adjustable cage assembly of FIG. 2 in a partially-open position.

FIG. 4C is an isometric view of the adjustable cage assembly of FIG. 2 in partially-closed position.

DETAILED DESCRIPTION

Figure 1:
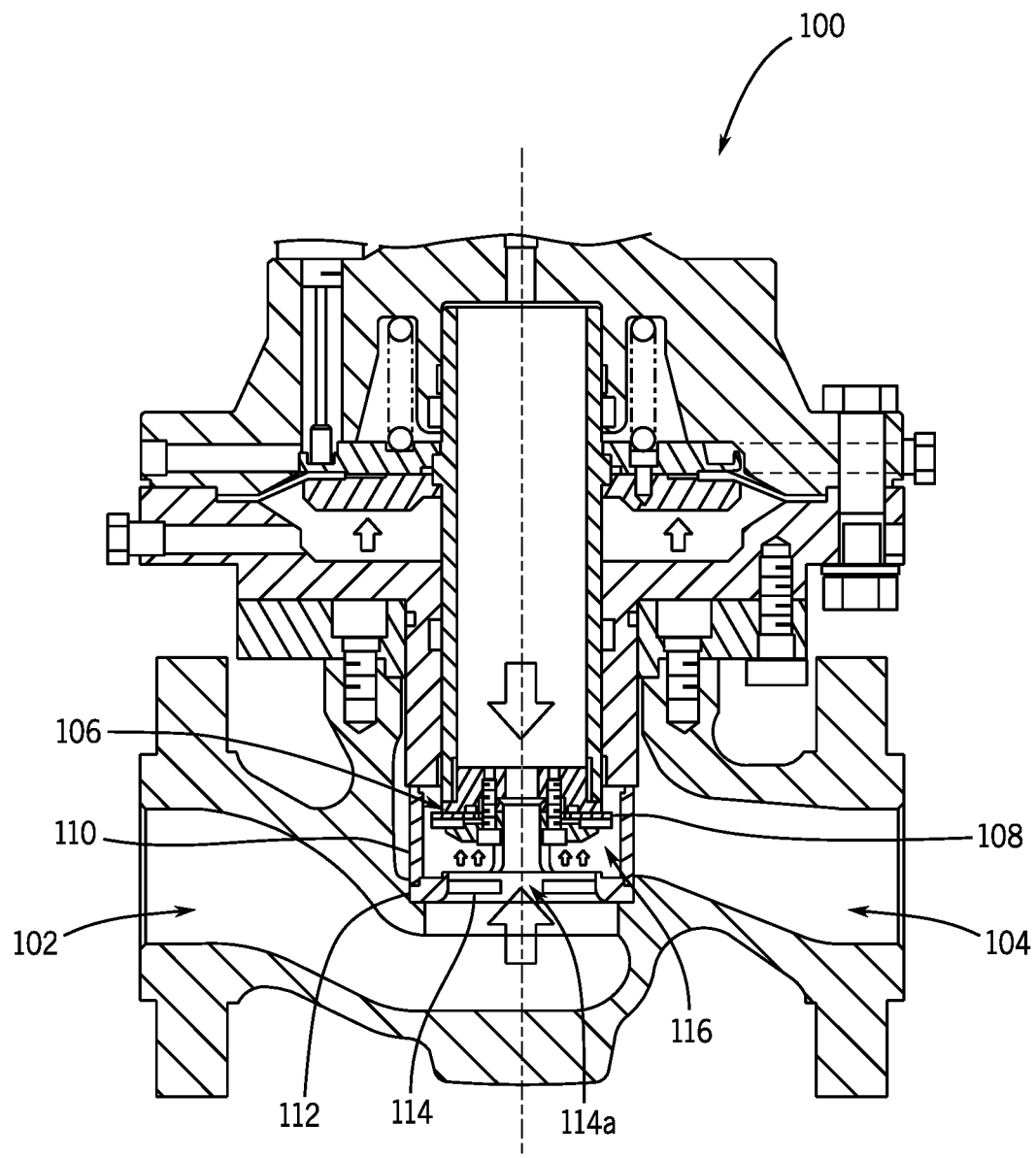
FIG. 1 is a cross-sectional partial view of a flow control device including a restriction cage.

The following discussion is presented to enable a person skilled in the art to make and use examples of the disclosed technology. Various modifications to the illustrated examples will be readily apparent to those skilled in the art, and the generic principles herein can be applied to other examples and applications without departing from the disclosed technology. Thus, examples of the disclosed technology are not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of examples of the disclosed technology. Skilled artisans will recognize the examples provided herein have many useful alternatives and fall within the scope of disclosed technology.

Before any examples of the disclosed technology are explained in detail, it is to be understood that the disclosed technology is not limited in its application to the details of construction and the arrangement of components set forth in the following description or illustrated in the attached drawings. The disclosed technology is capable of other examples and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As briefly discussed above, flow control devices can be used to decrease flowrate or pressure of a fluid flowing from a fluid source toward a downstream application. Certain systems and vessels require protection to avoid over-pressurization. Flow control devices, such as regulators and relief valves, for example, can be used in such systems to reduce or relieve excess fluid pressure. In general, a flow control device can include an inlet, an outlet, and a flow control assembly. The flow control assembly can include a primary control member, such as a disc or other plug, for example, and a secondary control member to further restrict flow through the flow control device.

In some flow control devices, including regulators, a curtain area can be formed between a valve seat and a primary control member. In general, the curtain area is a flow window created by an open valve at a maximum lift and is a function of an orifice circumference and the travel of the valve. In some cases, a secondary control member can be placed within the curtain area to further restrict flow through the regulator (or other device). The flow restriction provided by the secondary control member can help to reduce the flow through the regulator while avoiding damage to the seat (e.g., when certain secondary control members are installed in a regulator, the flow may not be damagingly directed into the seat at high pressure drops). In some examples, a secondary control member can be configured in particular to provide flow with improved pressure characteristics as part of a noise attenuating cage assembly (e.g., to reduce a decibel level for operation of a valve at otherwise equivalent flow conditions or otherwise improve sonic performance).

Examples of the disclosed technology can provide an adjustable secondary control member that can accommodate any of a range of desired flow restrictions through a flow control device without requiring the replacement of an entire flow control device, which can lead to a substantial increase in cost and system complexity. For example, some configurations of the disclosed technology provide a restriction cage that can be adjusted to change a profile of one or more intermediate openings of the cage, so that a desired flowrate can be provided through the cage via the one or more intermediate openings. In general, in this regard, an adjustable cage assembly according to examples of the disclosed technology can include first and second cage bodies configured to be rotationally fixed to each other at a plurality of alignments to provide a flow opening of variable size for adjustable control of fluid flowrates through the cage assembly, and thereby through a flow control device. The adjustability can provide a relatively high resolution of variable flow rates (e.g., small adjustment intervals) for a flow control device without excessive or invasive modifications to the flow control device.

In some examples, a restriction cage can include substantially identical first and second cage bodies (i.e., cage bodies produced with the same manufacturing processes and equipment based on the same specifications or geometry) that can be assembled together into an adjustable assembly. Each cage body can, for example, include two pairs of legs. When the restriction cage is assembled, one pair of the legs can be disposed at an outer diameter of the cage, and the other pair of legs can be disposed at an inner diameter of the cage. Thus, for example, substantially identical cage bodies can be oriented opposite each other and assembled to form a complete, adjustable assembly.

In some examples, outer-diameter legs or other features on a first cage body can include a locking member, such as a protruding lug or rib, for example, that is configured to interlock with a gap (e.g., recess) on the inner-diameter legs or other features on a second cage body. In some cases, such a gap can be included in a plurality of gaps (e.g., plurality of spaced recesses) corresponding to a plurality of adjustable positions of the adjustable cage. Likewise, in some examples, the outer-diameter legs can include one or more gaps, and the inner diameter legs can include a locking member, such as a protruding lug or rib, for example.

In some examples, an adjustable restriction cage can include rotationally securable first and second cage bodies. In some cases, when a first cage body is rotationally locked relative to a second cage body, the first cage body may still be movable (e.g., slidable) axially relative to the second cage body. In some examples, relative axial movement of the first and second cage bodies may be prevented via a coupling (e.g., mechanical or magnetic) between the first and second cage bodies. For example, the first and second cage bodies may be secured via a roll pin, set screw, retaining clip, etc. In some examples, the first and second cage bodies may be axially secured via tapered lugs or other tapered features so that an interference is formed between the first and second cage bodies when slid into an axial alignment. For example, a lock member may have a tapered end portion that permits one cage body to slide axially in one direction relative to the other cage body into a locking position. Once in the locking position, the one cage body may be prevented from moving in an opposing second direction to axially secure the cage bodies.

Further, in some examples, windows (e.g., openings) of an adjustable restriction cage can be configured to receive panels therein to provide additional flow restriction through the adjustable window cage. For example, a whisper panel (e.g., a mesh panel with an array of orifices) may be inserted into or radially aligned with one or more of the windows of the adjustable window cage to further restrict flow to a desired flow rate.

In some examples, an adjustable cage can be configured as an adjustable cage, including as can provide an adjustable total flow area via adjustable alignment of radial passages through an annular cage assembly. In some cases, an adjustable cage can thus adjustably provide lower operational decibel levels for a given set of flow characteristics, improved pressure behavior and other flow dynamics (e.g., as can help to ensure execution of a full commanded lift of a particular valve element), and accommodation for changing overall levels of process flows over time (e.g., as average or expected downstream demand changes due to site improvements)

Referring now to FIG. 1, an example flow control device 100 is illustrated. The flow control device 100 is configured as a pressure reducing regulator. The flow control device 100 includes an inlet 102, an outlet 104, and a control assembly 106. The control assembly 106 includes a disk holder assembly 108 and a control member 110. In the illustrated example, the control member 110 is configured as a secondary control member that surrounds the seat 112 of the flow control device 100 such that the control member 110 is positioned in the flow path between the inlet 102 and the outlet 104 immediately downstream of the seat 112. In general, the control member 110 can be configured as an adjustable restriction cage, according to examples of the disclosed technology. Particular examples of configurations for an adjustable restriction cage will be described below in detail, including with reference to FIGS. 2-8. Generally, however, a control member configured as an adjustable restriction cage can be manually adjusted (e.g., prior to installation) to provide a selected profile for one or more restriction openings (e.g., windows through the cage) for flow through the cage, and the flow control device 100 at large. In this way, for example, an installer or operator can customize the restriction behavior of the control member to the needs of a particular application.

In some examples, a control member according to the disclosed technology can provide generally improved performance for a flow control device (e.g., a regulator), particularly at low valve lift, as well as increased adaptability. For example, in some conventional designs, a restricted trim plate can be used to reduce flow or increase pressure drop through a flow control device, including as illustrated with the plate 114 in FIG. 1. Although a restriction orifice 114a of the plate 114 can provide for reduced flow and increased pressure drop, fluid dynamics downstream of the orifice 114a can result in an area of reduced pressure upstream of the curtain area 116 (e.g., as indicated by relative size of block arrows in FIG. 1, representing local pressures). Force imbalances caused by this reduced-pressure area can sometimes result in suboptimal performance of the device 100. However, in some examples, placement of the control member 110 as shown (e.g., as an adjustable restriction cage at or downstream of the curtain area 116) can allow the plate 114 to be removed before operation or omitted entirely.

While the control member 110 in FIG. 1, which is configured as an adjustable restriction cage, is installed in the flow control device 100 as shown (i.e., configured as a regulator), it should be appreciated that an adjustable restriction cage or other control members according to examples of the disclosed technology can be installed in other flow control devices, including in other regulators and in different types of valves, such as relief valves, for example. For example, as also discussed below, some examples can be configured as adjustable noise reducing cages.

Figure 2:
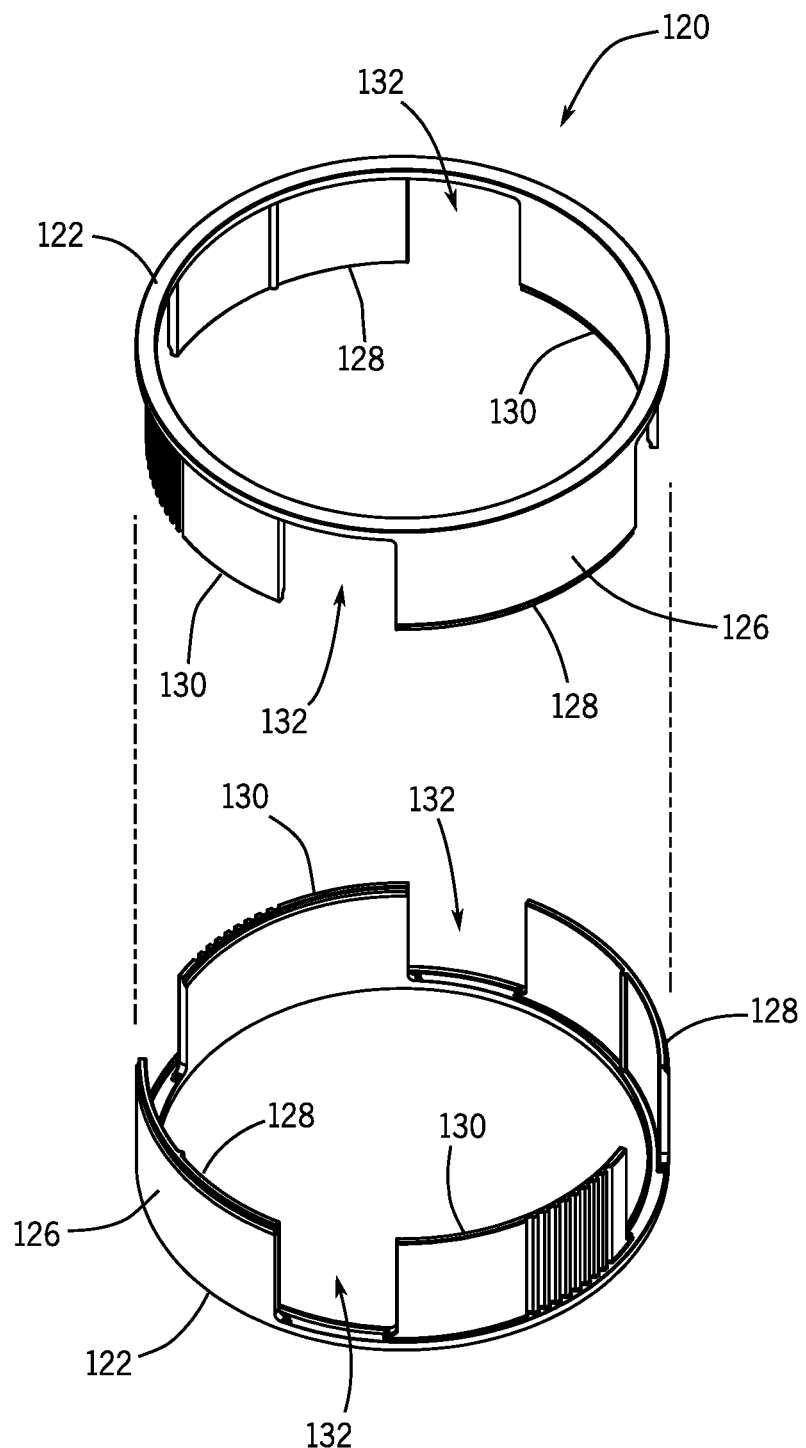
FIG. 2 is an exploded isometric view of an adjustable cage assembly according to an example of the disclosed technology.

FIG. 2 illustrates a control member configured as a restriction cage 120 according to an example of the disclosed technology. In general, the restriction cage 120 may be installed in a variety of flow control devices, including with a similar configuration as the control member 110 in the flow control device 100. In particular, the restriction cage 120 is configured as an adjustable cage assembly having first and second cage bodies 122. In the illustrated example, the first and second cage bodies 122 are substantially identical to each other, as can facilitate simplified manufacturing and easy use. However, other configurations are also possible.

As shown in FIG. 2, each of the cage bodies 122 includes a circumferential wall 126. Further, as shown, each of the circumferential walls 126 includes a plurality of wall segments. In particular, in the illustrated example, the circumferential wall 126 includes two pairs of wall segments 128, 130, each circumferentially separated from adjacent wall segments 130, 128 by an opening 132. Further, all of the wall segments 128, 130 have the same circumferential length and axial height and are regularly spaced around the circumferential wall 126. In other examples, a circumferential wall of a first cage body can include more or fewer, or otherwise different wall segments and corresponding openings, compared to the restriction cage 120.

Figure 3:
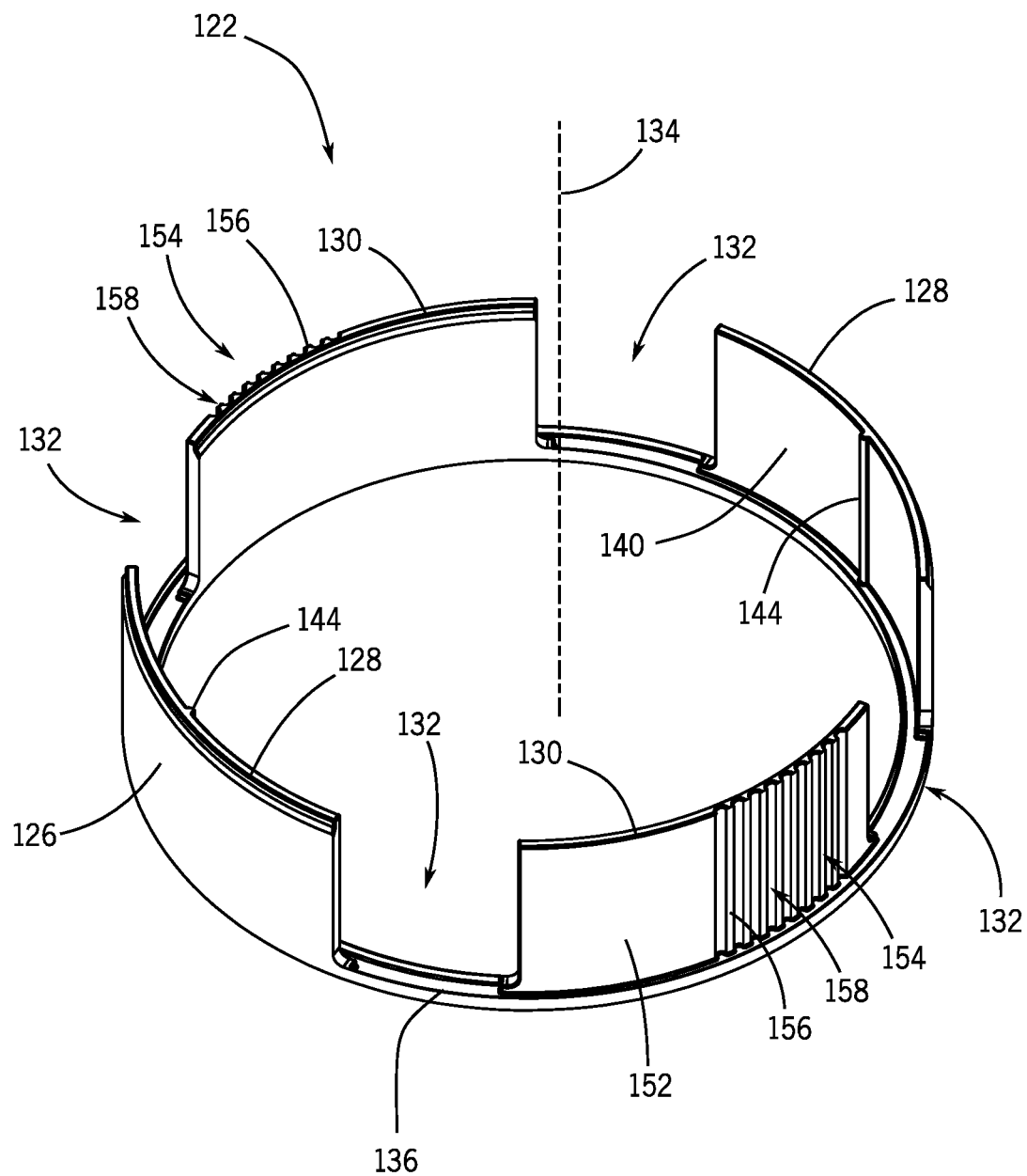
FIG. 3 is an isometric view of one cage body of the adjustable cage assembly of FIG. 2.

With reference to FIG. 3, one of the cage bodies 122 is illustrated in isolation. As briefly described above, the cage body 122 includes a first pair of wall segments 128 and a second pair of wall segments 130. The wall segments 128, 130 are circumferentially spaced about a central axis 134 of the cage body 122. In general, the cage body 122 is configured as an annular member and includes a continuous annular base 136. Each of the wall segments 128, 130 extend axially from the annular base 136. In the illustrated example, the wall segments 128, 130 are alternately spaced so that the first pair of wall segments 128 are opposite each other and the second pair of wall segments 130 are opposite each other. Further, the wall segments 128 are generally radially farther from the axis 134 than the wall segments 130, as will be further discussed below.

Each of the first wall segments 128 includes an interior surface 140 and an exterior surface opposite the interior surface 140. The interior surface 140 faces toward the central axis 134 and the exterior surface faces away from the central axis 134. Further, the interior surface 140 includes a first locking feature 144. In the illustrated example, the first locking feature 144 is a locking member configured as a rib that extends axially along the first wall segment 128. In other examples, a first locking feature of a cage body can be configured as one or more other protrusions or as one or more recesses that extend fully or partially along a wall segment, or as a differently configured detent configured to engage a corresponding locking feature on another cage body to rotationally secure the two cage bodies.

Each of the second wall segments 130 includes an exterior surface 152 and an interior surface opposite the exterior surface 152. The interior surface faces toward the central axis 134 and the exterior surface 152 faces away from the central axis 134. The exterior surface 152 includes a second locking feature 154. In the illustrated example, the second locking feature 154 includes an array of locking members configured as a plurality of ribs 156 and a series of grooves 158 that extend axially along the second wall segment 130. In other examples, a second locking feature of a cage can be configured as one or more other protrusions or recesses that extend fully or partially along a wall segment to engage a corresponding locking feature on another cage body to rotationally secure the two cage bodies, or as a differently configured feature configured to engage a corresponding detent (or other first locking feature).

As briefly described above, the cage body 122 also includes the openings 132 circumferentially spaced about the central axis 134 and formed in the circumferential wall 126. In general, each of the openings 132 is configured as a cutout in the circumferential wall 126 (e.g., a three-sided cutout, as shown), bounded by the first and second pairs of wall segments 128, 130 and the annular base 136. In the illustrated example, each opening 132 has a substantially similar width (i.e., a circumferential arc length between the wall segments 128, 130). However, in other examples, a cage body may include openings within a circumferential wall having varied widths.

Referring now to FIGS. 4A-C, the first and second cage bodies 122 of the restriction cage 120 can be oriented in axially opposite configurations and then rotationally secured relative to one another at a plurality of alignments to provide any selected one of a plurality of profiles for an intermediate opening 162. For example, FIG. 4A illustrates the restriction cage 120 in a fully-open position. In the fully-open position, each opening 132 of the cage bodies 122 are fully radially aligned (i.e., are positioned for maximum overlap along common radial directions relative to a flow axis) so that neither of the first nor second pairs of wall segments 128, 130 overlap with any openings 132 of the cage bodies 122. Conversely, with the restriction cage 120 in a fully-closed position (not shown), both pairs of wall segments 128, 130 can overlap fully with the openings 132 to prevent flow through the restriction cage 120 via the openings 132. In use with a flow control device, for example, the fully-open position of the restriction cage 120 illustrated in FIG. 4A can correspond to a maximum capacity flowrate allowed through the intermediate openings 162 of the restriction cage 120.

In the illustrated example, to reduce the flow rate through the restriction cage 120, one of the cage bodies 122 may be rotated relative to the other cage body 122. For example, the top restriction cage 122 illustrated in FIGS. 4A-C can be rotated in the direction indicated by the arrow to decrease the size of the profile at the intermediate opening 162. As shown in FIG. 4B, the restriction cage 120 is in a partially-open position. In use with a flow control device, the partially-open position illustrated in FIG. 4B can correspond to a reduced capacity flow rate allowed through the restriction cage 120 compared to the alignment of the restriction cage in FIG. 4A.

To further reduce the flow rate through the restriction cage 120, one of the cage bodies 122 may be rotated (e.g., the top cage body 122 in FIGS. 4A-C in the direction indicated by the arrow) to further decrease the size of the intermediate opening 162. As shown in FIG. 4C, the restriction cage 120 is in another partially-open position. In some examples, the partially-open position illustrated in FIG. 4C can correspond to a minimum rated capacity flow rate allowed through the restriction cage. For example, in the alignment of the cage bodies 122 illustrated in FIG. 4C, the first locking feature 144 may be engaged with the second locking feature 154 at an end groove of the series of grooves 158 so that the opening 162 formed by a partial alignment of the openings 132 of the first and second cage bodies 122 forms a smallest and most restrictive flow area through the restriction cage 120.

As generally described above, the intermediate opening 162 is thus configured as a variable flow opening that corresponds to an adjustable effective flow area through the restriction cage 120. In particular, for the illustrated example, as the opening 162 is increased or decreased, the cross-sectional area of the effective flow area varies linearly. For example, the area of the opening 162, which is formed by varied alignment of the openings 132 of the first and second cage bodies 122, is linearly proportional to the relative rotational alignment of the first and second cage bodies 122—at least over a range of possible degrees of rotation (e.g., between a fully-closed and fully-opened configuration). As a result, in use, the incremental adjustability of the opening 162 can provide precise, linearly adjustable flow control for a flow control device (e.g., regulator).

In general, the incremental adjustability of the restriction cage 120 can provide a high degree of flow control through a flow control device (e.g., a valve). In particular, the restriction cage 120 can be used to control flow within a valve based on a variety of external conditions. For example, a housing development (e.g., a neighborhood) may eventually require a relatively high gas flowrate. However, while a valve rated for a high flow rate may ultimately be suitable, in early stages of the development, gas demand may be low. In such instance, a restriction cage, such as the restriction cage 120, may be used to decrease flow openings of the valve so that the flow rate is controlled to an appropriate level for the required gas at an early stage of the development. In particular, a fixed cage can clamp down on the flow openings of the valve so that the valve can travel over more of its stable rage, as opposed to being a small distance (e.g., 1 millimeter) away from the seat in an unstable position. Additionally, in use, as demand increases, the restriction cage can be replaced or removed.

The variability of the restriction cage 120 can allow for flow rate adjustability based on a fluid flowrate demand or requirement. Additionally, the restriction cage 120 can help ensure that the flow control device in which the restriction cage 120 is installed is operated over a stable range for the expected fluid flowrate demand. As described above, a fluid flowrate demand can be dictated by the development of a neighborhood, among other factors, such as seasonal changes, for example.

Figure 5:
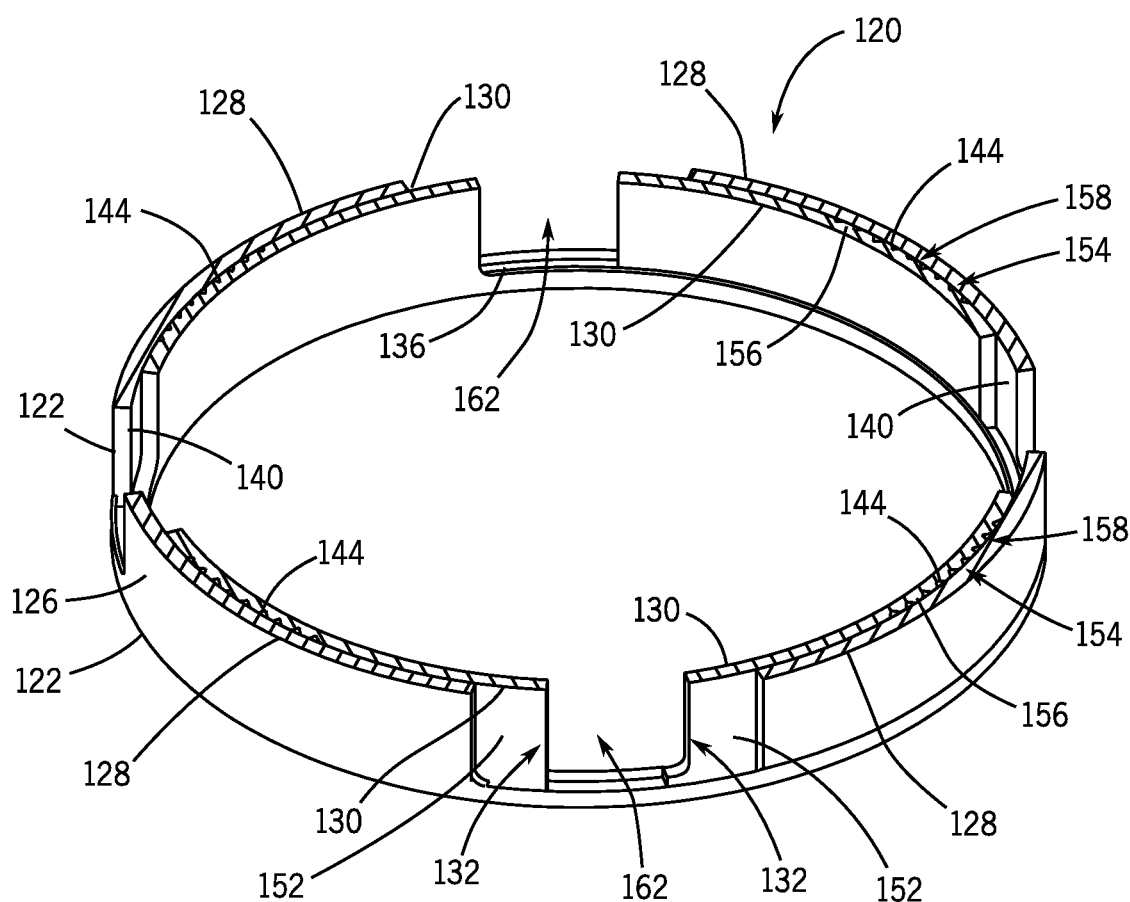
FIG. 5 is a cross-sectional isometric view of FIG. 4B taken along line 5-5.

With reference to FIG. 5, the first and second cage bodies 122 may be rotationally secured to one another when the first locking feature 144 is engaged with the second locking feature 154. For example, in the illustrated configuration, the first locking feature 144 is secured between two of the plurality of ribs 156 in one of the series of grooves 158. As illustrated in FIGS. 4A-C, and further exemplified in FIG. 5, rotating one of the first or second cage bodies 122 relative to the other cage body 122 can adjust the amount of overlap between their respective first and second circumferential walls 126. In the illustrated example, the number of grooves 158 correspond to the number of alignment positions between the first and second cage bodies 122, and therefore, the number of variable effective flow areas via the opening 162.

The use of ribs and grooves for locking features can be particularly beneficial in some cases, including by allowing easy and guided axial movement of cage bodies during assembly while correspondingly providing relatively robust resistance against rotational movement. However, a variety of other locking features can be used in other examples, to provide appropriate anti-rotational (or other) locking engagement.

Further illustrated in FIG. 5, when the first and second cage bodies 122 are rotationally secured to one another, the interior surfaces 140 of the first pair of wall segments 128 face and can abut the exterior surfaces 152 of the corresponding second pair of wall segments 130. In particular, because the wall segments 128 are radially offset from the wall segments 130, the wall segments 128, 130 of the first cage body 122 can interleave with the wall segments 130, 128 of the second cage body 122 and the cage bodies 122 can be moved axially into engagement with each other. Further, as also accommodated by the radial offset of the wall segments 128, 130, the ribs 144 can be lockingly engaged with an appropriate one of the grooves 158 as a direct consequence of the axial engagement. Thus, for example, an operator can determine an appropriate rotational alignment, then axially engage the cage bodies 122 together to both define and lock a size of the intermediate openings 162.

In some examples, an adjustable cage assembly may be configured as an infinitely adjustable restriction cage. For example, rather than having incremental alignment points between a first cage body and a second cage body (e.g., similar to the cage bodies 122), the cage bodies may be secured to one another at any degree of rotation along a continuous range (e.g., 360 degrees or more). In some examples, an infinitely adjustable restriction cage may include a locking mechanism to rotationally secure the first cage body relative to the second cage body. The locking mechanism, for example, can include a retention pin, a locking clip, a spring-biased retainer, or an interference fit, such as a press fit or friction connection, for example. In other examples, the first cage member can be fixed relative to the second cage member via a weld joint, for example, or by engagement with one or more other components within a flow control device.

The above description of the restriction cage 120 includes two matching cage bodies 122 having generally rectangular openings 132 formed in the respective circumferential walls 126. The rectangular openings 132 are generally symmetric about a vertical axis that extends parallel to the central axis 134, and therefore, form the rectangular variable opening 162. However, in other examples, an opening in a circumferential wall of a cage body of a restriction cage may include a variety of geometries which can form a corresponding variety of intermediate-opening profiles that form an effective flow area through the restriction cage.

FIGS. 6-8 illustrate example opening profiles in a cage body that may be incorporated into a restriction cage, such as the restriction cage 120, for example. It will be appreciated that various geometries of opening profiles can be used in combination with the same (e.g., identical to within tolerances inherent to producing cage bodies to the same specifications) or different profiles formed in first and second cage bodies to form variable effective flow areas through the restriction cage. In particular, a restriction cage can include first and second cage bodies each having the same or different opening profiles formed in a corresponding circumferential wall.

Figure 6A:
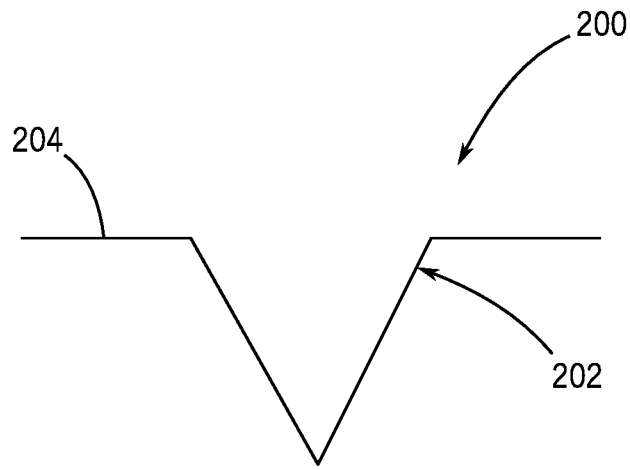
FIG. 6A is a schematic illustration of a cage body profile according to an example of the disclosed technology.
Figure 6B:
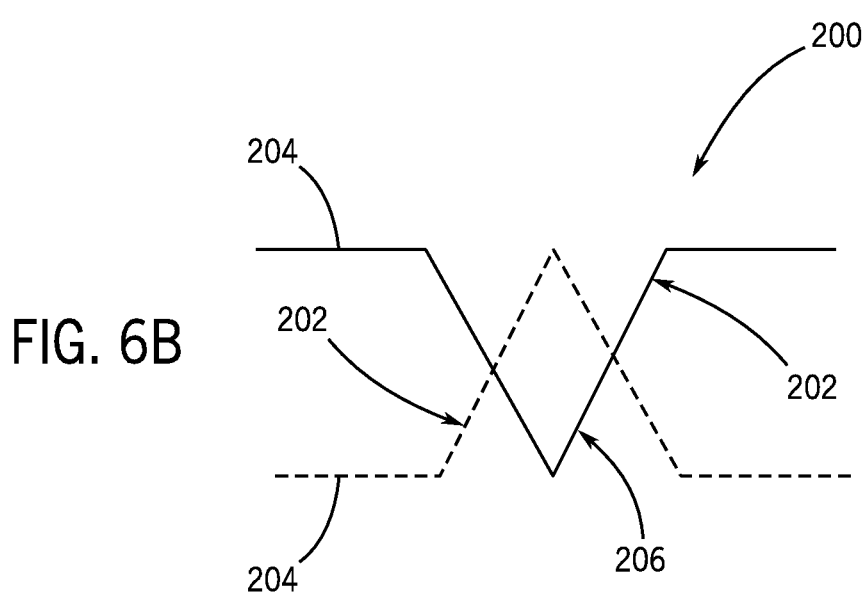
FIG. 6B is a schematic illustration of a flow opening formed by the cage body profile of FIG. 6A.
Figure 6C:
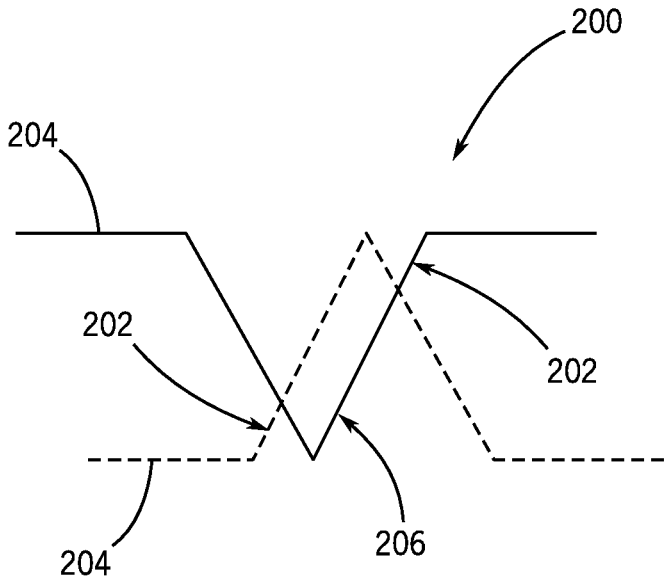
FIG. 6C is a schematic illustration of another flow opening formed by the cage body profile of FIG. 6A.

FIG. 6A illustrates a cage body profile 200 of an adjustable restriction cage according to one example of the disclosed technology. The cage body profile 200 includes an opening 202 formed in a circumferential wall 204 of a cage body (two shown in FIGS. 6B and 6C, as installed, one in dashed lines). In the illustrated example, the opening 202 is generally triangular and is symmetric about a vertical axis. FIGS. 6B and 6C illustrate varied alignments of the openings 202 of first and second cage body profiles 200 to form an intermediate opening 206. As with the intermediate opening 162, the intermediate opening 206 is thus a variable opening, the overall profile of which can be adjusted based on rotational alignment of first and second cage bodies.

Figure 7A:
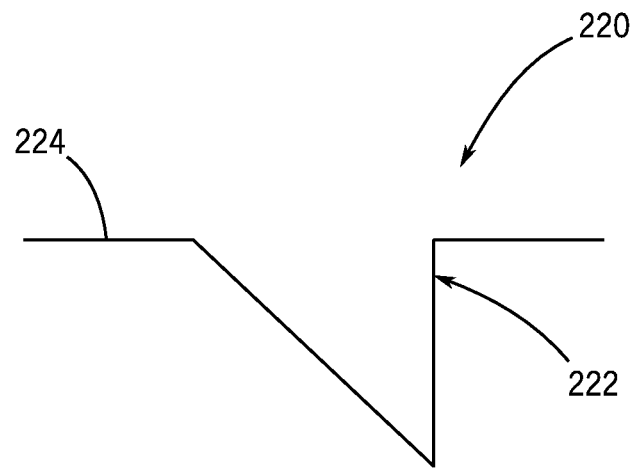
FIG. 7A is a schematic illustration of a cage body profile according to an example of the disclosed technology.
Figure 7B:
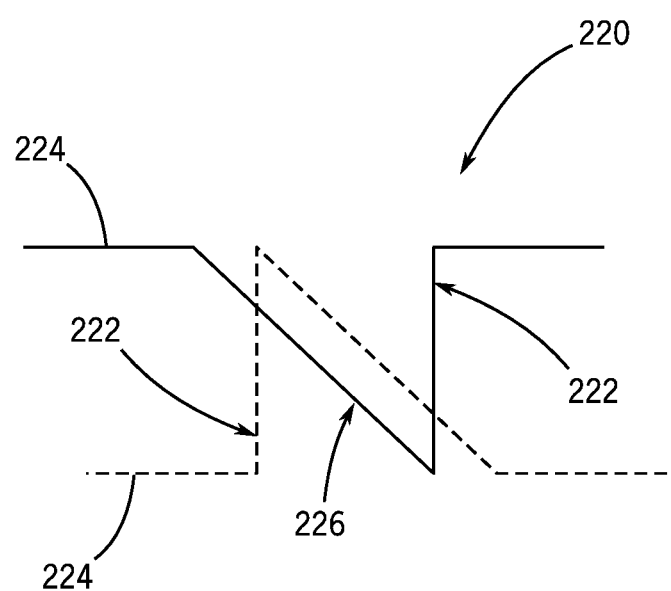
FIG. 7B is a schematic illustration of a flow opening formed by the cage body profile of FIG. 7A.
Figure 7C:
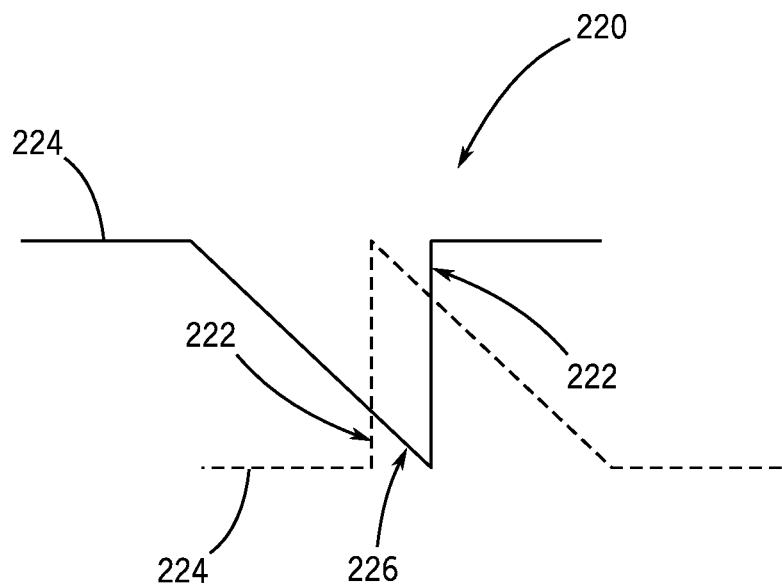
FIG. 7C is a schematic illustration of another flow opening formed by the cage body profile of FIG. 7A.

Similarly, FIG. 7A illustrates a cage body profile 220 of an adjustable restriction cage according to another example of the disclosed technology. The cage body profile 220 includes an opening 222 formed in a circumferential wall 224 of a cage body (two shown in FIGS. 7B and 7C, as installed, one in dashed lines). In the illustrated example, the opening 222 is generally triangular and is not symmetric about a vertical axis. FIGS. 7B and 7C illustrate varied alignments of the openings 222 of the first and second cage body profiles 220 to form an intermediate opening 226. Also like the intermediate opening 162, the intermediate opening 226 is thus a variable opening, the overall profile of which can be adjusted based on a rotational alignment of the first and second cage bodies.

Figure 8A:
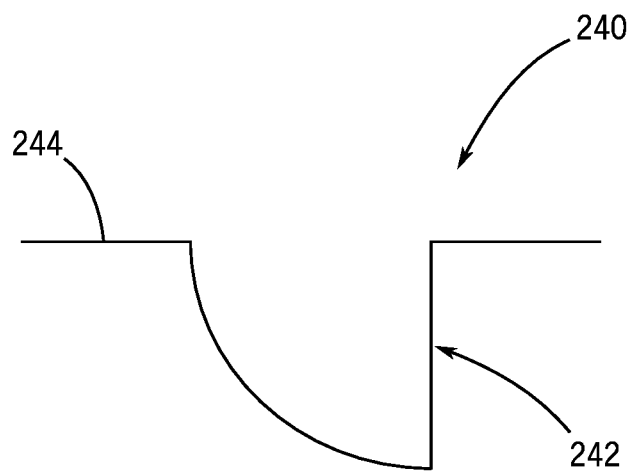
FIG. 8A is a schematic illustration of a cage body profile according to an example of the disclosed technology.
Figure 8B:
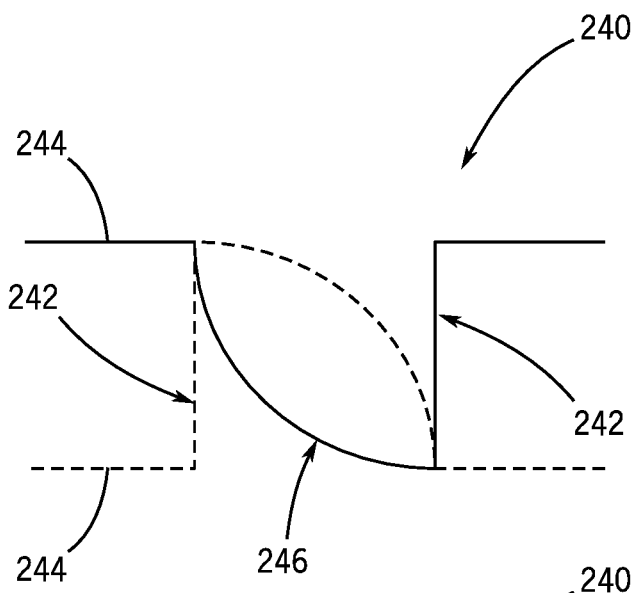
FIG. 8B is a schematic illustration of a flow opening formed by the cage body profile of FIG. 8A.
Figure 8C:
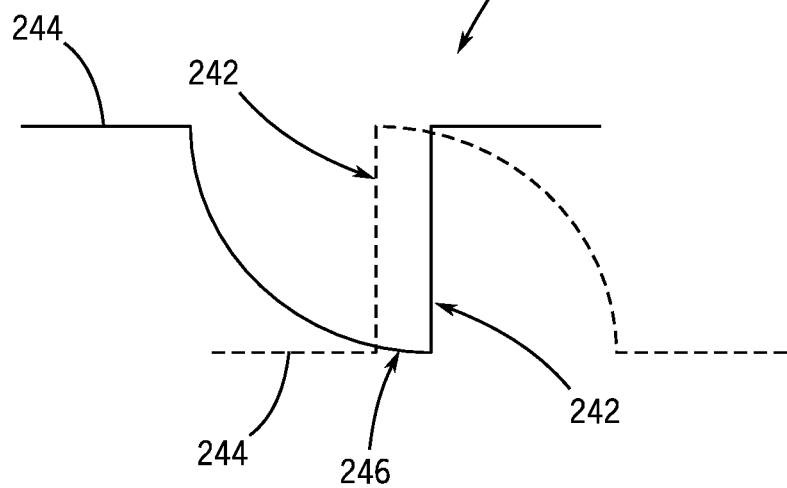
FIG. 8C is a schematic illustration of another flow opening formed by the cage body profile of FIG. 8A.

Further, FIG. 8A illustrates a cage body profile 240 of an adjustable restriction cage according to another example of the disclosed technology. The cage body profile 240 includes an opening 242 formed in a circumferential wall 244 of a cage body (two shown in FIGS. 8B and 8C, as installed, one in dashed lines). In the illustrated example, the opening 242 includes a non-polygonal geometry with a curved portion. FIGS. 8B and 8C illustrate varied alignments of the openings 242 of the first and second cage body profiles 240 to form an intermediate opening 246, which can be adjusted based on a rotational alignment of the first and second cage bodies.

Additionally, due to the curved geometry of the openings 242, the cage body profile 240 can provide unique and non-linear effective flow areas proportional to the rotational alignment of the first and second cage bodies (e.g., as shown by comparison of FIGS. 8B and 8C). In other examples, other profiles (e.g., other curved or polygonal profiles) can be configured to optimize relationships between rotational adjustment and changes in effective flow area for a particular installation.

In some examples, including as presented in the examples of FIGS. 9 through 14C, an adjustable cage assembly can be configured as a noise attenuation cage, as can allow operators to adjustably tune acoustic performance (e.g., maximum decibel levels) of a flow control assembly for one or more particular flows (e.g., to reduce noise in a regulator as service flow is increased to meet growing customer demand). Further, in some cases, pressure dynamics associated with acoustic performance can result in suboptimal performance of a flow control device (e.g., inability to fully open a valve for maximum flow). In some examples, adjustably configurable noise attenuating cages (or other similar adjustable cage assemblies) can thus allow operators to optimize overall valve performance as well as (or as an alternative to) optimizing acoustic performance.

Generally, the example assemblies discussed below (and otherwise herein) can be installed in and operated with a variety of flow control devices, including pressure reducing regulator 100 of FIG. 1 or other flow control devices discussed herein or generally known in the art. Further, although the assemblies of FIGS. 9 through 14C may be particularly suitable for use as noise attenuating cages to improve acoustic performance, these assemblies can be beneficially employed in a variety of installations and applications including to otherwise beneficially control aspects of flow dynamics near a sealing assembly of a valve or other flow control device. Similarly, the adjustable cages discussed above may in some cases be employed as adjustable noise attenuating cages for acoustic improvement of valve performance.

In some examples, noise attenuating cages can include multiple cage bodies that can be selectively aligned with each other to provide different flow characteristics for flow through the cage (e.g., generally radial flow from or to a sealable seat of a flow control device). For example, in various combinations, one or more cage bodies with first patterns of flow openings can be selectively inserted in various configurations into a cooperative assembly (e.g., an annular cage assembly) with another cage body with a second pattern of flow openings (e.g., a different pattern), or can be selectively rotated to different orientations relative another cage body.

In some examples, an annular cage body can be configured to selectively receive one or more cage body inserts, with the flow characteristics of any particular configuration being determined partly by the particular pattern of flow openings of a particular selected cage body insert, and by the particular alignment of the flow openings of the insert with flow openings of the annular cage body, as determined by the inserted orientation of the insert. For example, for any given insert, different overlaps of patterns of flow openings can be provided by different insert selections, different insertion orientations or locations, or different installed combinations with other inserts (e.g., regarding relative locations on the annular cage body, relative rotational orientations, degrees of symmetry, etc.). Thus, for example, operators can provide different flow configuration for a particular flow control valve, including to adapt to changed downstream demand over time, by selectively installing (e.g., and reinstalling) selected inserts in selected orientations relative to a common base (annular) cage body.

In some examples, similar adjustability for noise attenuating cages can be provided by rotatable annular cage bodies, each of which include respective patterns of flow openings. For example, for radially nested annular cage bodies (i.e., arrangements in which one cage body is nested radially to the inside of another cage body), changes in relative rotational orientation of the cage bodies can provide different alignments between flow openings of one cage body and flow openings of the other cage body. Thus, for example, by relative rotational adjustment of inner and outer annular cage bodies, different total flow areas or different other flow structures (e.g., distribution patterns of flow areas) can be provided for flow through a given noise reducing cage (e.g., generally radial flow to or from a valve seat).

Figure 9:
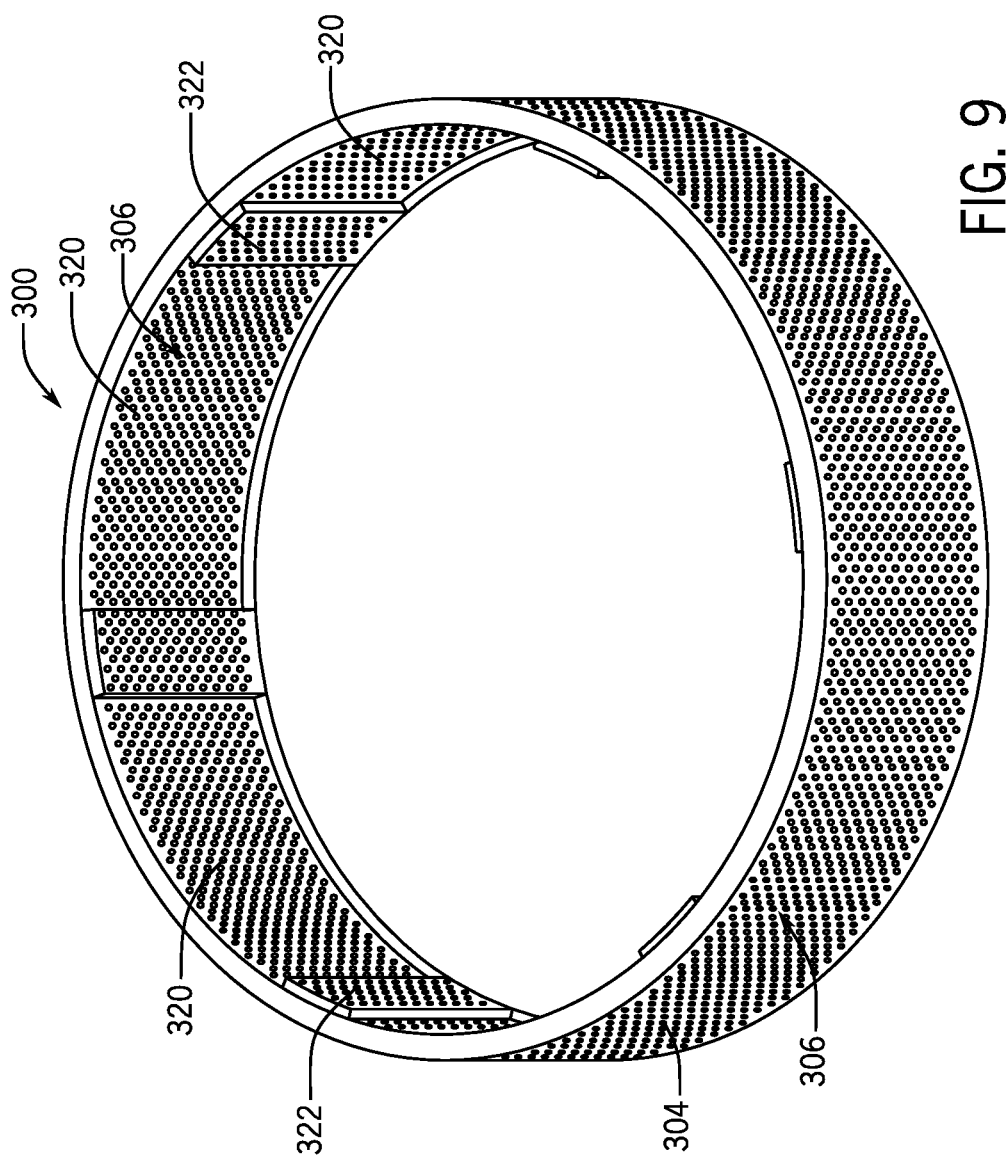
FIG. 9 is an isometric view of an annular cage body of adjustable cage assembly according to an example of the disclosed technology.

FIG. 9 is an isometric view of a cage body 300 for use with an adjustable cage assembly, according to an example of the disclosed technology. In particular the cage body 300 is an integrally formed (e.g., additively manufactured) annular body, with a pattern of flow openings 306 extending radially through the cage body 300 between a radially interior surface 302 and a radially exterior surface 304 of the cage body 300. In the illustrated example, the flow openings 306 extend in a regular, repeating pattern fully around the circumference of the cage body 300 and over substantially all of the axial height of the cage body 300, so as to provide a particular collective flow area for radial flow through the cage body 300. Thus, for example, with the cage body 300 installed in a flow control device as generally illustrated in FIG. 1, the flow openings 306 can define a reduced flow area for process flow through the flow control device, with control characteristics relative to a particular flow (e.g., particular rate, fluid, conditions, etc.) dependent on the size, shape, and overall geometrical arrangement of flow openings 306. (Although generally shown herein with multiple openings, different arrangements of flow openings can in some cases include different arrangements of a single flow opening.)

In some examples, as also discussed above, a cage body can be configured to receive and removably retain one or more cage body inserts to further define control characteristics of a collective cage body assembly. In some examples, an annular cage body can be used cooperatively with different selected sets of inserts, with particular inserts arranged in different orientations relative to each other or the cage body that receives the inserts, etc. to provide a variety of customized configurations with corresponding flow control characteristics. For example, a first assembly with a first set of inserts secured to a first annular cage body in a first orientation and order (e.g., along a circumference of the annular body) may provide a different flow control characteristic than a second assembly with a second, different set of inserts secured to the first annular cage body or a third assembly with the first set of inserts secured to the first annular cage body in a second, different orientation or order.

Generally, cage body inserts can include particular patterns of flow openings and a cage body configured to receive the inserts can include particular (e.g., different) patterns of flow openings. Thus, an assembly of a particular insert with a cage body with the insert in a particular orientation relative to the cage body can provide a particular overlap pattern of the flow openings of the insert and the cage body (e.g., a particular overlap of radial flow openings for generally radial flow) that can provide a particular flow area through the assembly and exhibit particular other relevant flow control characteristics (e.g., as defined by a particular geometric distribution of the available (overlapping) flow area).

In some examples, an insert can be secured to a recess of a different cage body, including through sliding or snap-in insertion. For example, as shown in FIG. 9, the cage body 300 includes an annular arrangement of recesses 320, each of which includes part of the pattern of the flow openings 306. Thus, with no inserts received in the recesses 320 (as shown in FIG. 9), the cage body 300 can provide first flow control characteristics, including as defined by the collective radial flow area of the flow openings 306. In contrast, including as further discussed below, when particular inserts are secured in the recesses 320, a collective flow path (and total flow area) defined by the overlap of insert openings (not shown in FIG. 9) with the flow openings 306 can provide a variety of other, different flow control characteristics.

In some examples, recesses on a cage body to receive cage body inserts can be arranged on an upstream side of a cage assembly relative to the relevant process flow. For example, the interior arrangement of the recesses 320 as shown in FIG. 9 may correspond to a radially outward flow (e.g., as in flow-up operation for the flow control device 100 of FIG. 1). With the recesses 320 thus on the upstream side of a process flow through a flow control device, the flow pressure of process fluid may tend to further secure installed inserts to the cage body 300 rather than urge the inserts away from the cage body 300. In some installations, however, recesses may be included on a downstream side of cage body (e.g., only on a downstream side, or on upstream and downstream sides). (As used in the context of annular cage bodies or other similar assemblies, "upstream" and "downstream" refer to generally radial flow through the cage bodies or assemblies.)

As noted above, the uniform array and other aspects of the pattern of flow openings 306 are presented as examples only. Correspondingly, although the openings 306 are shown as being distributed with spatial uniformity within the recesses 320 and along separation sections 322 of the interior surface 302 between the recesses 320, other examples can exhibit other patterns. For example, some annular cage bodies may include flow openings primarily (e.g., only) within recesses, may include different patterns (e.g., different sizes, spacings, shapes, etc.) of openings within recesses as compared to along separation sections, or may include different patterns of openings within particular recesses or on particular separation sections as compared to other recesses or separation sections.

Figure 10A:
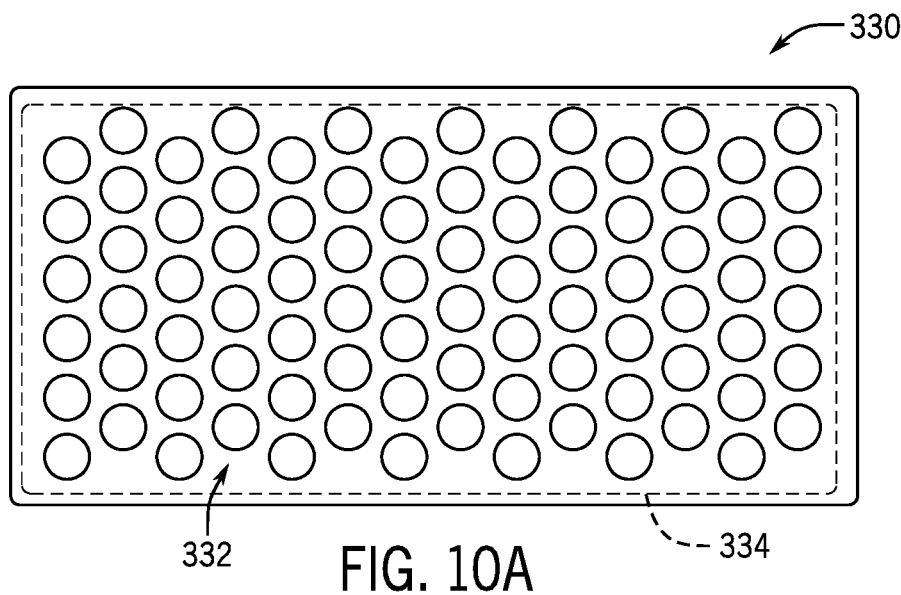
FIGS. 10A and 10B are simplified elevation views of removable inserts for use with the cage body of FIG. 9 according to an example of the disclosed technology.
Figure 10B:
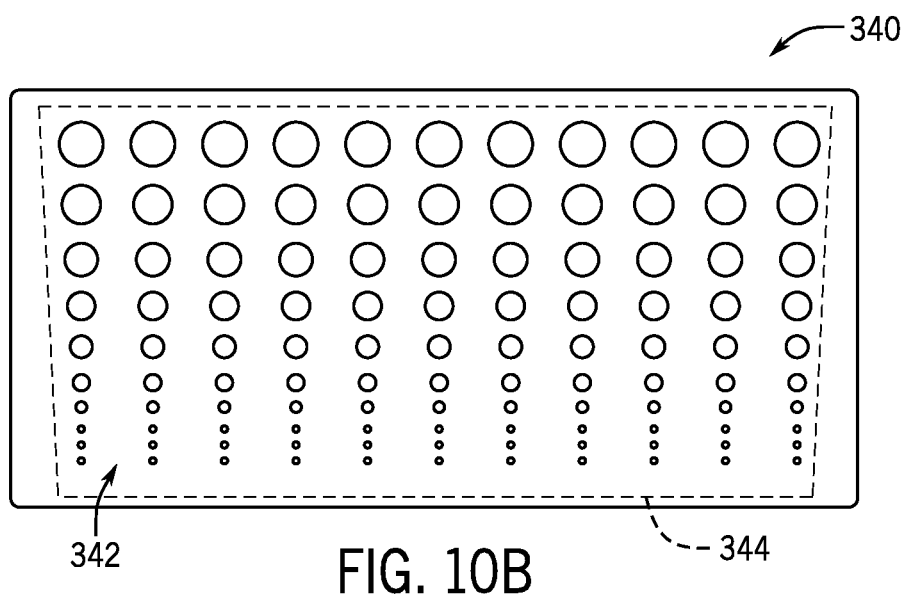

In different examples, an insert can include a variety of different flow opening patterns, including relative to the size, shape, array pattern, spacing, orientation, cross-sectional flow characteristics of one or more radial flow openings. As illustrated in FIG. 10A, for example, a first insert 330 can include a regular alternating-offset array of uniformly circular flow openings 332, arranged within a flow pattern area 334 that is generally rectangular and substantially fills the total available surface of the insert 330. As another example, as shown in FIG. 10B, a second insert 340 can include a regular array of circular flow openings 342 with a less concentrated arrangement within a similarly expansive flow pattern area 344 and with progressively reduced flow area for individual openings and the pattern area 344 as a whole, from a frame of reference moving from top to bottom as shown).

Thus, for example, insertion of the insert 330 into a particular one of the recesses 320 of the annular cage body 300 of FIG. 9 can provide a first overlapping pattern between the flow openings 332 and the flow openings 306, and a corresponding flow control characteristic for the combined assembly. Further, insertion of the insert 340 into the particular one of the recesses 320 of the cage body 300 can provide a second, different overlapping pattern between the flow openings 342 and the flow openings 306 and a correspondingly different flow control characteristic for the combined assembly. Further, different overlapping patterns and flow control characteristics can also be provided by similarly installing the insert 340, but in a reversed orientation (e.g., with top as shown in FIG. 10B) nearer to a relevant seat of a flow control device. In other words and more generally, selection of a particular insert and a particular installation configuration (e.g., location and relative orientation) can selectively provide a variety of flow control characteristics, including as can allow for optimization of acoustic characteristics of a particular flow through a particular flow control device.

As generally noted above, a variety of different patterns of flow openings can be provided so that overlapping installations of cage bodies can customizably provide different flow characteristics for a noise attenuating cage. In some examples, differences in patterns of flow openings may include differences in flow pattern areas of a particular cage body (i.e., an envelope area on the cage body within which flow openings are provided). For example, although the flow area 334 is generally rectangular, whereas the flow area 344 is generally trapezoidal, tapering toward the bottom of the insert 340 in the orientation shown. In other examples, similarly shaped and arrayed flow openings as shown on the inserts 330, 340 can be included in differently shaped flow pattern areas (e.g., covering more or less of the surface of the relevant insert 330, 340). Similarly, flow pattern areas as shown or in other configurations can be used with a variety of other flow opening arrays.

Figure 11:
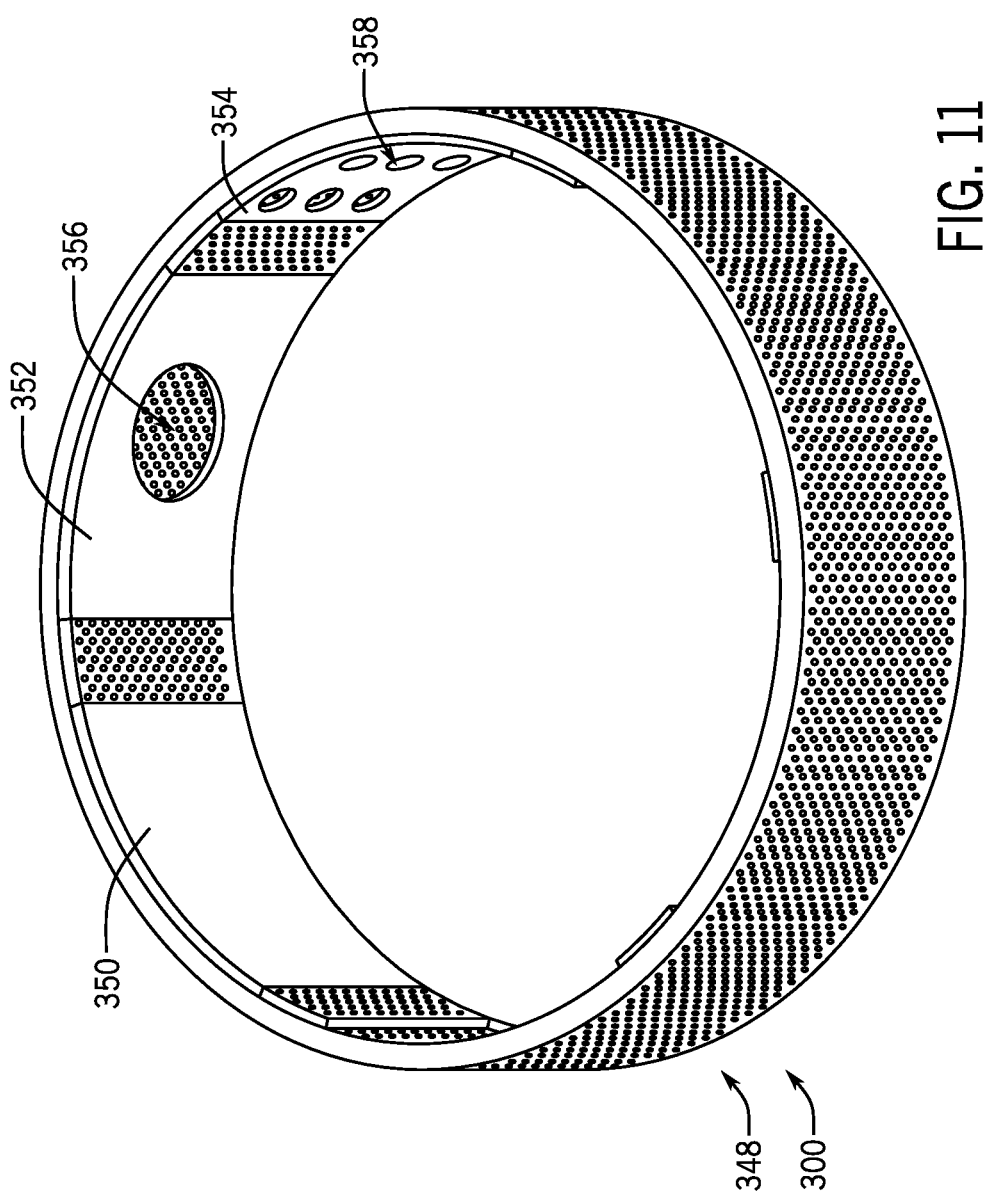
FIG. 11 is an isometric view of the cage body of FIG. 9 in an annular cage assembly with multiple inserts that provide different respective local radial flow configurations.

As a further example, FIG. 11 illustrates an assembly 348 of the annular cage body 300 with three inserts 350, 352, 354 received in adjacent recesses 320. As shown, each of the inserts 350, 352, 354 has a different pattern of flow openings. Accordingly, the collective assembly provides different overlap patterns for flow openings at each of the occupied recesses 320 and thus provides different respective local radial flow configurations. As shown in FIG. 11, the insert 350 is a blocking insert without any flow openings, the insert 352 is a single-orifice insert with a centered flow opening 356 with a large diameter (e.g., is at least half of the axial height of the cage body 300), and the insert 354 is a multi-orifice insert with a regular array of flow openings 358 that are individually smaller than the flow opening 356 (e.g., but collectively larger) and individually larger than the flow openings 332, 342 of FIGS. 10A and 10B (e.g., but collectively smaller). In other examples, as also generally noted above, a variety of other flow opening configurations are possible. Similarly, different arrangements of inserts can be installed any one or more of the recesses 320, including multiple instances of any of the inserts 330, 340, 350, 352, 354.

Figure 12:
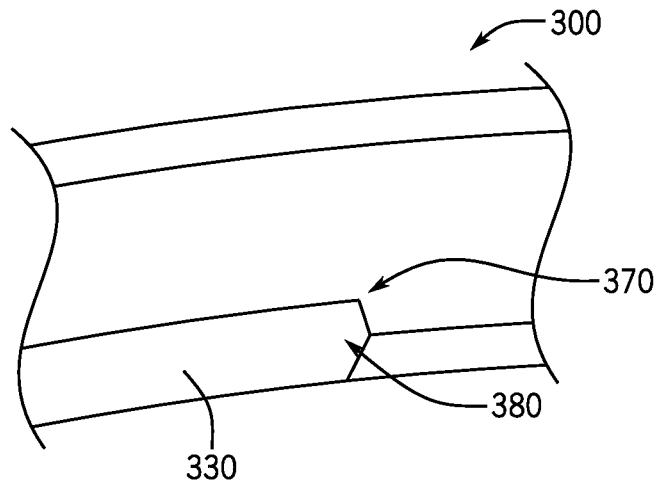
FIG. 12 is a top plan partial view of an annular flow assembly with a removable insert and the cage body of FIG. 9.

In different examples, as also noted above, inserts can be received and secured using a variety of structures, including for snap-in or slide-in engagements. In some examples, dovetail connections can provide particularly secure and easy to customize assemblies. Thus, in some cases, the recesses 320 of the cage body and associated inserts (e.g., the inserts 330, 340, 350, 352, 354) can include complementary dovetail profiles. For example, as shown in FIG. 12, one or more edges (one shown) of one or more of the recesses 320 (one shown) can include an undercut formation to provide a dovetail receiving profile 370, and the insert 330 can include a complementary dovetail insertion profile 380. Thus, for example, the insert 330 can be easily slid axially into and out of engagement with the annular cage body 300 (e.g., before installation or after removal, to customize a flow control device) while remaining securely held relative to generally radial forces (e.g., from the dynamic pressure of a process flow).

Figure 13:
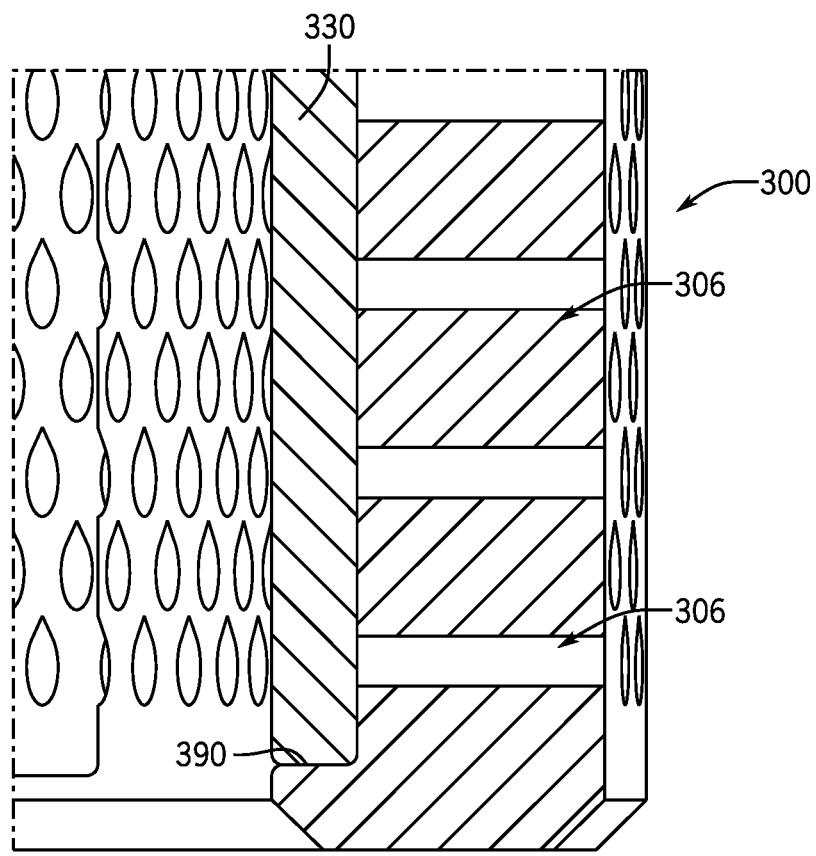
FIG. 13 is an isometric view of the annular assembly of FIG. 12.

In some examples, recesses for flow control inserts can include a shelf to support and secure inserts that are selectively installed into the recesses. For example, as shown in FIG. 13, the recesses 320 of the annular cage body 300 can include one or more integrally formed shoulders 390 that can receive and secure a received insert (e.g., the insert 330, as shown). In some examples, including as shown, a shelf on a cage body can be included on an end of a cage body that is configured to installed closest to a relevant valve seat (e.g., as shown in FIG. 13 for the cage body 300).

Figure 14:
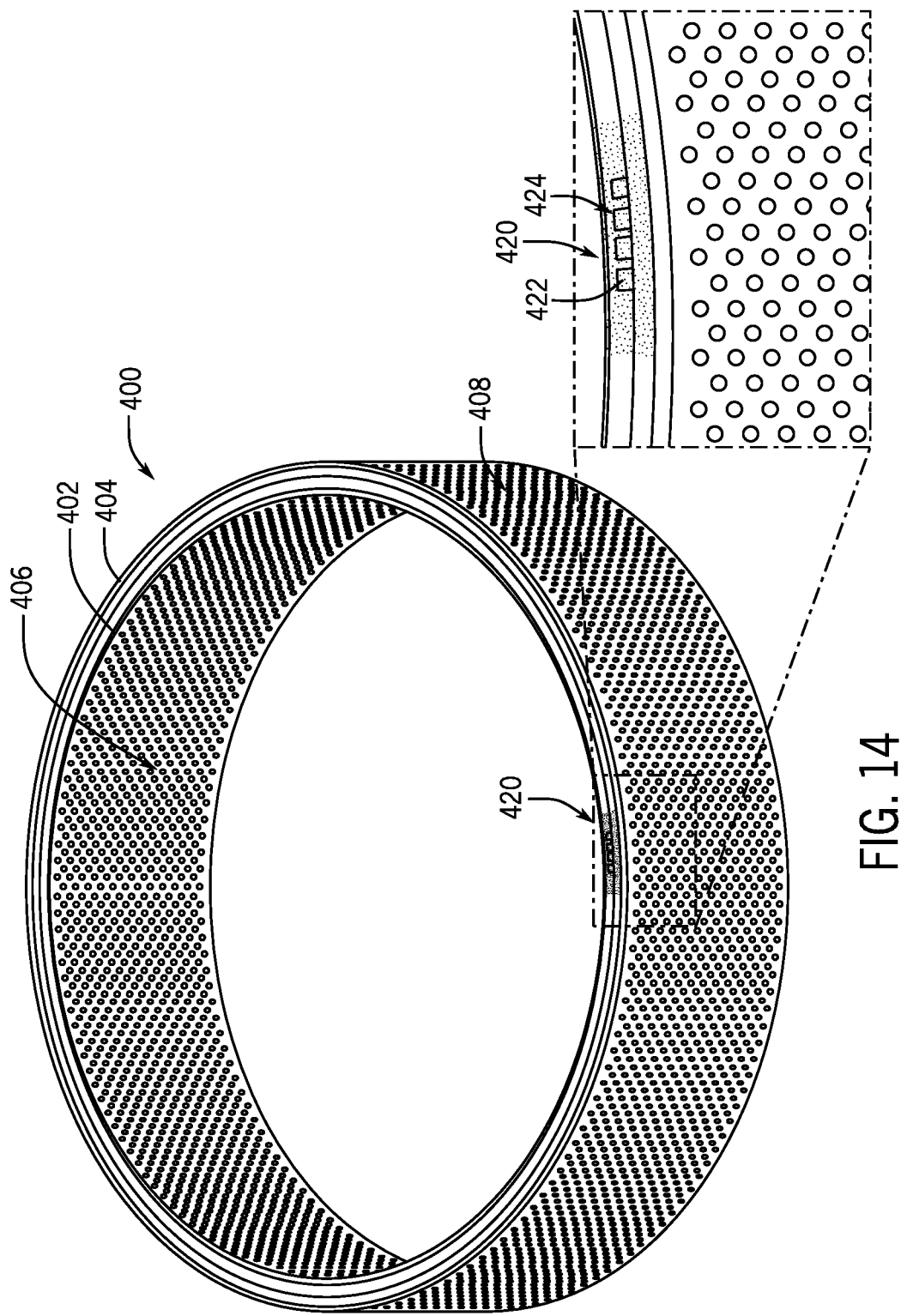
FIG. 14 shows an isometric view and an enlarged isometric partial view of another adjustable cage assembly according to an example of the disclosed technology.

In some examples, as also generally discussed above, radially nested cage bodies can be rotatable relative to each other (e.g., by actual rotation of one or more of the cage bodies) to provide different overlap patterns for flow openings and, thus, customizable flow control characteristics. For example, FIG. 14 illustrates another example adjustable cage assembly 400, according to an example of the disclosed technology, which can be adjusted for different flow control characteristics by adjustments to the relative rotational orientation of two annular cage bodies. In particular, the cage assembly 400 includes a radially interior (e.g., upstream) annular cage body 402 that is concentrically nested within a radially exterior (e.g., downstream) annular cage body 404. Both of the cage bodies include similar patterns of flow openings 406, 408 as shown (e.g., with substantially identically sized flow openings in substantially identical arrays), although other configurations are possible, including as discussed above.

Figure 15C:
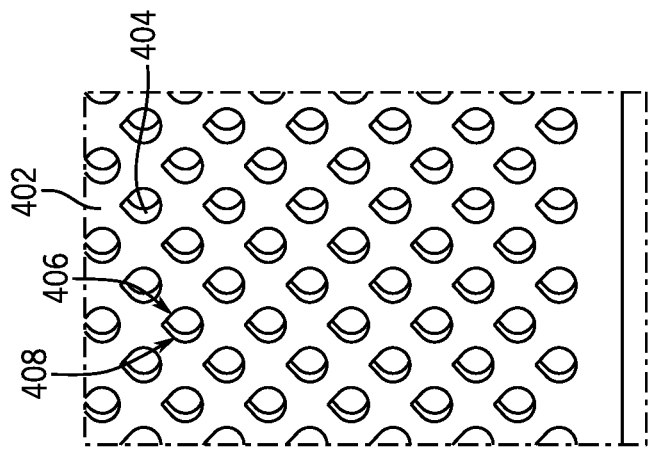
FIGS. 15A-15C illustrate different example alignment of openings through first and second cage bodies of the cage assembly of FIG. 14, corresponding to different radial flow areas for an associated flow control device.
Figure 15B:
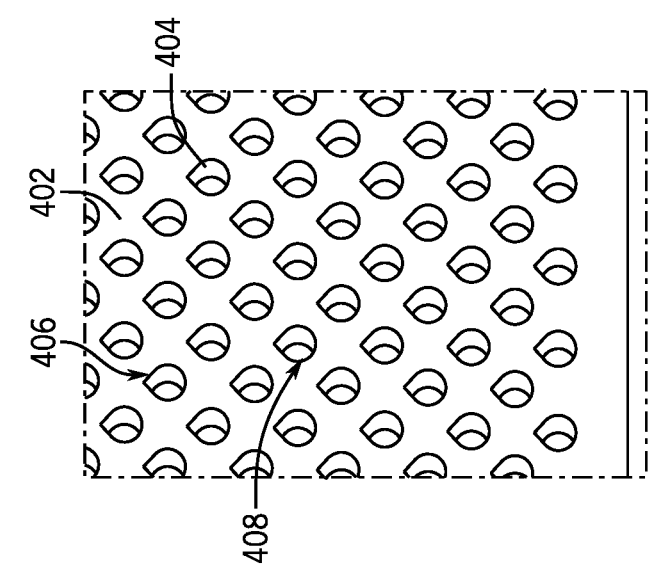
Figure 15A:
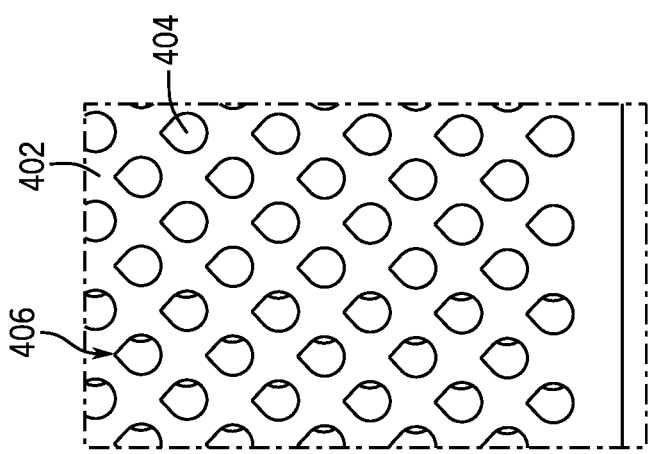

With the illustrated arrangement, depending on the relative rotational orientation of the cage bodies 402, 404 relative to each other, different alignments of the patterns of the flow openings 406, 408 can result in different total flow areas for the assembly 400 or other varied flow control characteristics. As one example, as shown in FIGS. 15A, a first configuration with a first rotational orientation may provide complete misalignment of the flow openings 406, 408, so that the assembly 400 permits minimal flow for a given pressure drop. With progressive rotation of the cage bodies 402, 404, as shown in FIGS. 15B and 15C, increased flow area (and other changes in flow control characteristics) can thus be progressively provided. In some cases, one or more rotational configurations (not shown) can fully align the flow openings 406, 408, so that the assembly 400 provides a maximal flow for a given pressure drop.

In some examples, cage bodies can be selectively lockable in different configurations (e.g., different relative orientations) to provide different flow control characteristics. For example, as noted above, snap-in configurations can be used in some configurations. In some examples, a detent arrangement can be provided to selectively secure rotatable cage bodies at any of a plurality of configurations. As shown in FIG. 14, for example, a detent arrangement 420 can include a protrusion 422 on the exterior cage body 404 and a series of corresponding (e.g., complementary) recesses 424 arranged circumferentially in series along the interior cage body 402. (In other examples, this and other protrusion-recess arrangements can alternatively be structurally reversed with, for example, the protrusion 422 on the cage body 402 and the recesses 424 on the cage body 404.) Correspondingly, the assembly 400 can provide a particular flow control characteristic depending on which of the recesses 424 the protrusion 422 is received into. For example, a left-most recess 424 on the cage body 404 (relative to the perspective of FIG. 14) may correspond to the opening overlap pattern of FIG. 15A, the next successive recess 424 may correspond to the overlap pattern of FIG. 15B, the next successive recess 424 may correspond to the overlap pattern of FIG. 15C, and the right-most recess 424 may correspond to a fully open (fully aligned) configuration. Although the detent arrangement 420 is shown (and described) with the protrusion 422 and the recesses 424, other combinations of stop features (e.g., multiple complementary or other protrusions, differently formed recesses, etc.) can be used in other detent features according to generally known mechanical principles.

In some examples, a locking arrangement can be configured so that a particular adjustment of a cage body results in a smaller effective adjustment of an alignment of two flow opening patterns. For example, a locking arrangement can include adjacent locking features that are spaced by somewhat more than a corresponding spacing between flow openings (e.g., being larger than the flow opening spacing by a non-integer multiple greater than 1). Thus, for example, a manual adjustment of the locking arrangement between configurations corresponding to the adjacent locking features can result in a much smaller effective change in alignment of flow openings.

In some cases, such a locking arrangement can be employed with cage bodies that have flow openings with substantially equal spacings between relevant adjacent flow openings. Correspondingly, regular movement of the cage bodies relative to each other can result in regular, but smaller adjustment of flow opening overlap patterns (e.g., from fully misaligned to fully aligned). For example, as shown in FIG. 14, a spacing between adjacent pairs of the recesses 424 can be approximately 25% greater than a spacing between adjacent sets of the flow openings 406, 408 along a circumferential profile of the respective cage body 402, 404. Correspondingly, a relatively large change in the rotational orientation of the cage body 402, 404 (e.g., as can be more easily executed manually) can result in a relatively small change in the alignment of the patterns of the flow openings 406, 408.

Although select notable combinations of flow opening patterns are presented in the various figures (as further discussed above and below), other examples can include any variety of combinations of the opening patterns expressly illustrated herein or others. For example, radial flow openings according to one or more of the examples below can be included on one or multiple cooperating cage bodies, in various combinations with one or more of the cage body profiles discussed above: e.g., with one cage body having an array of radial flow openings as discussed below and a complementary cage body having a larger-opening cage body profile as discussed above. Likewise, in some examples, patterns of openings illustrated or described herein for cage assembly inserts can be instead (or additionally) be used on an annular cage body configured to receive an insert or to rotate relative to another annular cage body, and vice versa.

Thus, examples of the disclosed technology can provide a system and method of adjusting an effective flow area in a flow control device and other flow control characteristics. The previous description of the disclosed examples is provided to enable any person skilled in the art to make or use the disclosed technology. Various modifications to these examples will be readily apparent to those skilled in the art, and the generic principles defined herein may be applied to other examples without departing from the spirit or scope of the disclosed technology. Thus, the disclosed technology is not intended to be limited to the examples shown herein but is to be accorded the widest scope consistent with the principles and novel features disclosed herein.

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A: B: C: A and B: A and C: B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C: B, but not A and C; and C, but not A and B. A list preceded by "one or more" (and variations thereon, e.g., "at least one of") and including "or" to separate listed elements indicates options of one or more of any or all of the listed elements. For example, the phrases "one or more of A, B, or C" and "at least one of A, B, or C" indicate options of: one or more A: one or more B: one or more C: one or more A and one or more B: one or more B and one or more C: one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B: B and C: A and C; and A, B, and C.

Also as used herein, unless otherwise limited or defined, "integral" and derivatives thereof (e.g., "integrally") describe elements that are manufactured as a single piece without fasteners, adhesive, or the like to secure separate components together. For example, an element stamped or cast as a single-piece component from a single piece of sheet metal or a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Unless otherwise specified or limited, the terms "about," "approximately," and "substantially" as used herein with respect to a reference value refer to variations from the reference value of ±5%, inclusive.

As used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

The invention claimed is:

1. An adjustable cage assembly for a flow control device, the adjustable cage assembly comprising:
a first cage body having an interior surface and an exterior surface and first openings extending from the interior surface to the exterior surface to provide a first-body radial flow area through the first cage body; and
a plurality of removable inserts sized to be selectively received by the first cage body at the interior surface, wherein the adjustable cage assembly has:
a first configuration in which the first cage body and a first at least one of the plurality of removable inserts define an annular assembly with an alignment of the first at least one of the plurality of removable inserts relative to the first openings of the first cage body that provides a first cage-assembly radial flow area through the first cage body; and
a second configuration in which the first cage body, the first at least one of the plurality of removable inserts, and a second at least one of the plurality of removable inserts define an annular assembly with an alignment of the first and second at least one of the plurality of removable inserts relative to the first openings of the first cage body that provides a second cage-assembly radial flow area through the first cage body that is smaller than the first cage-assembly radial flow area.

2. The adjustable cage assembly of claim 1, wherein the first cage body and the plurality of removable inserts collectively define the annular assembly of the first configuration; and
wherein the plurality of removable inserts are differently rotationally aligned relative to at least one of each other or the first cage body in the first configuration as compared to the second configuration.

3. The adjustable cage assembly of claim 2, wherein the first cage body and the plurality of removable inserts are selectively lockable in the first configuration and in the second configuration.

4. The adjustable cage assembly of claim 3, wherein the first cage assembly and the plurality of removable inserts are selectively lockable in a third configuration in which the first cage body and the plurality of removable inserts collectively define an annular assembly with an alignment of the plurality of removable inserts relative to the first openings of the first cage body that provides a third cage-assembly radial flow area through the first cage body that is smaller than each of the first and second cage-assembly radial flow areas.

5. The adjustable cage assembly of claim 1, wherein the first cage body is a first annular cage body, and
wherein the plurality of removable inserts are differently ordered along a circumference of the first annular cage body in the first configuration as compared to the second configuration.

6. The adjustable cage assembly of claim 1, wherein the first cage body includes separation sections spaced circumferentially about the interior surface to circumferentially separate the plurality of removable inserts.

7. The adjustable cage assembly of claim 1, wherein the first cage body is a first annular cage body that includes a first insert recess, and
wherein one of the plurality of removable inserts is received in the first insert recess with the adjustable cage assembly in the first configuration, and the one of the plurality of removable inserts is not received in the first insert recess with the adjustable cage assembly in the second configuration.

8. The adjustable cage assembly of claim 7, further comprising:
wherein each of the plurality of the removable inserts is sized to be selectively received in the first insert recess.

9. The adjustable cage assembly of claim 8, wherein a first of the removable inserts includes a first pattern of flow openings and a second of the removable inserts includes a second pattern of flow openings different from the first pattern.

10. The adjustable cage assembly of claim 7, wherein the first insert recess includes a dovetail profile sized to receive a complementary dovetail profile of at least one of the plurality of removable inserts.

11. The adjustable cage assembly of claim 7, wherein the adjustable cage assembly is configured for flow through the flow control device in a radial flow direction relative to the adjustable cage assembly; and
wherein the first insert recess is arranged on an upstream one of the interior surface of the first annular cage body, relative to the radial flow direction.

12. The adjustable cage assembly of claim 1, wherein the first cage body is a first annular cage body, and
wherein the first annular cage body includes a plurality of insert recesses configured to selectively receive different arrangements of the plurality of removable inserts to define a corresponding plurality of cage-assembly radial flow areas through the first cage body.

13. An adjustable cage assembly for a flow control device, the adjustable cage assembly comprising:
an annular cage body having an interior surface and an exterior surface, first flow openings arranged to provide a first-body radial flow area through the first annular cage body, and first insert recesses arranged circumferentially around the annular cage body; and
a plurality of removable inserts, each having insert flow openings arranged to provide a respective flow area for flow through the removable insert;
wherein each of the plurality of removable inserts are sized to be selectively received in at least one of the first insert recesses, the first insert recesses defining dovetail profiles sized to engage a corresponding dovetail profile of one or more of the removable inserts, and to provide a corresponding radial flow area through the adjustable cage assembly that is defined by an overlap pattern between the first openings and the insert openings; and
wherein the adjustable cage assembly has a first radial flow area corresponding to the overlap pattern provided by a first insert of the removable inserts and a second, different radial flow area corresponding to the overlap pattern provided by a second insert of the removable inserts.

14. The adjustable cage assembly of claim 13, wherein the insert openings of the first removable insert include openings with a larger diameter than the first openings.

15. The adjustable cage assembly of claim 14, further comprising a third removable insert of the plurality of removable inserts,
   wherein no insert openings extend from an interior surface to an exterior surface of the third removable insert.

16. The adjustable cage assembly of claim 13, wherein the annular cage body includes a seat end and a flow end, the seat end being configured to be oriented closer to a seat of the flow control device,
   wherein the first insert recess includes a shelf at the seat end of the annular cage body to secure the removable inserts within the first insert recess.

17. The adjustable cage assembly of claim 13, wherein, including the first insert recess, the annular cage body includes a plurality of insert recesses arranged circumferentially around the annular cage body, the insert recesses being sized to selectively receive different arrangements of the plurality of removable insets to define a plurality of different total radial flow areas for the adjustable cage assembly.

18. A method of adjusting an effective flow area in a flow control device, the method comprising:
   selecting a first removable insert from a plurality of removable inserts, each of the plurality of removable inserts having insert flow openings arranged to provide a respective flow area for flow through the removable insert;
   inserting the first removable insert into a first insert recess or a second insert recess of a plurality of insert recesses arranged circumferentially around an annular cage body that defines a central axis, to form a first configuration of an adjustable cage assembly with a first overlap pattern between the insert flow openings of the first removable insert and flow openings of the annular cage body at the first or second insert recess, the first overlap pattern defining a first radial flow area for flow through the first configuration of the adjustable cage assembly;
   selecting a second removable insert from the plurality of removable inserts; and
   inserting the second removable insert into the other of the first or second insert recess of the plurality of insert recesses to form a second configuration of an adjustable cage assembly with a second overlap pattern between the insert flow openings of the second removable insert and the flow openings of the annular cage body at the first or second insert recess, the second overlap pattern defining a second radial flow area for flow through the second configuration of the adjustable assembly.

19. The method of claim 18, wherein the first insert recess is a dovetail recess that extends radially into an upstream surface of the annular cage body; and
   wherein inserting the first and second removable inserts into the first or second insert recess includes sliding the first and second removable inserts, respectively, axially into the first or second insert recess.

\* \* \* \* \*